(12) United States Patent
Palin et al.

(10) Patent No.: US 9,479,546 B2
(45) Date of Patent: Oct. 25, 2016

(54) METHOD, APPARATUS, AND COMPUTER PROGRAM PRODUCT FOR MEDIA CONTROL FOR MULTIPLE DEVICES

(71) Applicant: Nokia Corporation, Espoo (FI)

(72) Inventors: Arto Palin, Viiala (FI); Jukka Reunamaki, Tampere (FI); Niko Kiukkonen, Veikkola (FI); Antti Rantaeskola, Tampere (FI)

(73) Assignee: Nokia Technologies Oy, Espoo (FI)

( * ) Notice: Subject to any disclaimer, the term of this patent is extended or adjusted under 35 U.S.C. 154(b) by 26 days.

(21) Appl. No.: 14/477,378

(22) Filed: Sep. 4, 2014

(65) Prior Publication Data

US 2016/0072855 A1 Mar. 10, 2016

(51) Int. Cl.
| | |
|---|---|
| G06F 15/16 | (2006.01) |
| H04L 29/06 | (2006.01) |
| H04W 4/00 | (2009.01) |
| H04W 76/02 | (2009.01) |
| H04W 52/02 | (2009.01) |
| H04N 21/436 | (2011.01) |
| H04N 21/4363 | (2011.01) |
| H04W 84/12 | (2009.01) |

(52) U.S. Cl.
CPC ....... *H04L 65/1069* (2013.01); *H04L 65/4069* (2013.01); *H04N 21/436* (2013.01); *H04N 21/4363* (2013.01); *H04N 21/43615* (2013.01); *H04N 21/43637* (2013.01); *H04W 4/008* (2013.01); *H04W 52/0229* (2013.01); *H04W 76/025* (2013.01); *H04W 84/12* (2013.01)

(58) Field of Classification Search
CPC .................. H04L 65/1069; H04N 21/43615; H04N 21/43637; H04N 21/436; H04N 21/4363

USPC ............................... 709/218–219; 725/80–82
See application file for complete search history.

(56) References Cited

U.S. PATENT DOCUMENTS

| | | | |
|---|---|---|---|
| 8,447,227 | B2 | 5/2013 | Davis |
| 9,047,054 | B1 | 6/2015 | Goldstein et al. |
| 2007/0288470 | A1 | 12/2007 | Kauniskangas et al. |
| 2008/0004021 | A1 | 1/2008 | Sanjay |
| 2010/0070637 | A1* | 3/2010 | Saito .................. H04M 1/6066 709/228 |
| 2011/0126009 | A1 | 5/2011 | Camp, Jr. et al. |
| 2011/0126014 | A1 | 5/2011 | Camp, Jr. et al. |
| 2011/0191438 | A1 | 8/2011 | Huibers et al. |
| 2011/0191823 | A1 | 8/2011 | Huibers et al. |

(Continued)

*Primary Examiner* — Chris Parry
*Assistant Examiner* — Weiwei Stiltner
(74) *Attorney, Agent, or Firm* — Locke Lord LLP

(57) ABSTRACT

In an example embodiment, a method includes receiving, by an apparatus, one or more wireless discovery messages over a first wireless communication protocol; determining whether a source device of the one or more wireless discovery messages is a media playback device having required characteristics, based on information obtained from the received wireless discovery messages; transmitting a device information message that includes at least information usable for the source device to access the apparatus using a second wireless communication protocol, in response to determining that the source device is a media playback device having the required characteristics; establishing a wireless connection with the source device over the second wireless communication protocol in response to receiving a connection request from the source device over the second wireless communication protocol; and providing information regarding media content for playback to the source device over the wireless connection via the second wireless communication protocol.

12 Claims, 18 Drawing Sheets

(56) References Cited

U.S. PATENT DOCUMENTS

| | | |
|---|---|---|
| 2011/0210831 A1 | 9/2011 | Talty et al. |
| 2011/0263202 A1 | 10/2011 | Lee et al. |
| 2013/0229930 A1 | 9/2013 | Akay et al. |
| 2013/0250931 A1 | 9/2013 | Abraham et al. |
| 2014/0380159 A1 | 12/2014 | Reilly et al. |
| 2015/0189426 A1 | 7/2015 | Pang |
| 2015/0193198 A1 | 7/2015 | Hutchings et al. |
| 2015/0195857 A1 | 7/2015 | Pan et al. |
| 2015/0304336 A1* | 10/2015 | Yu .................. H04L 63/102 726/4 |

* cited by examiner

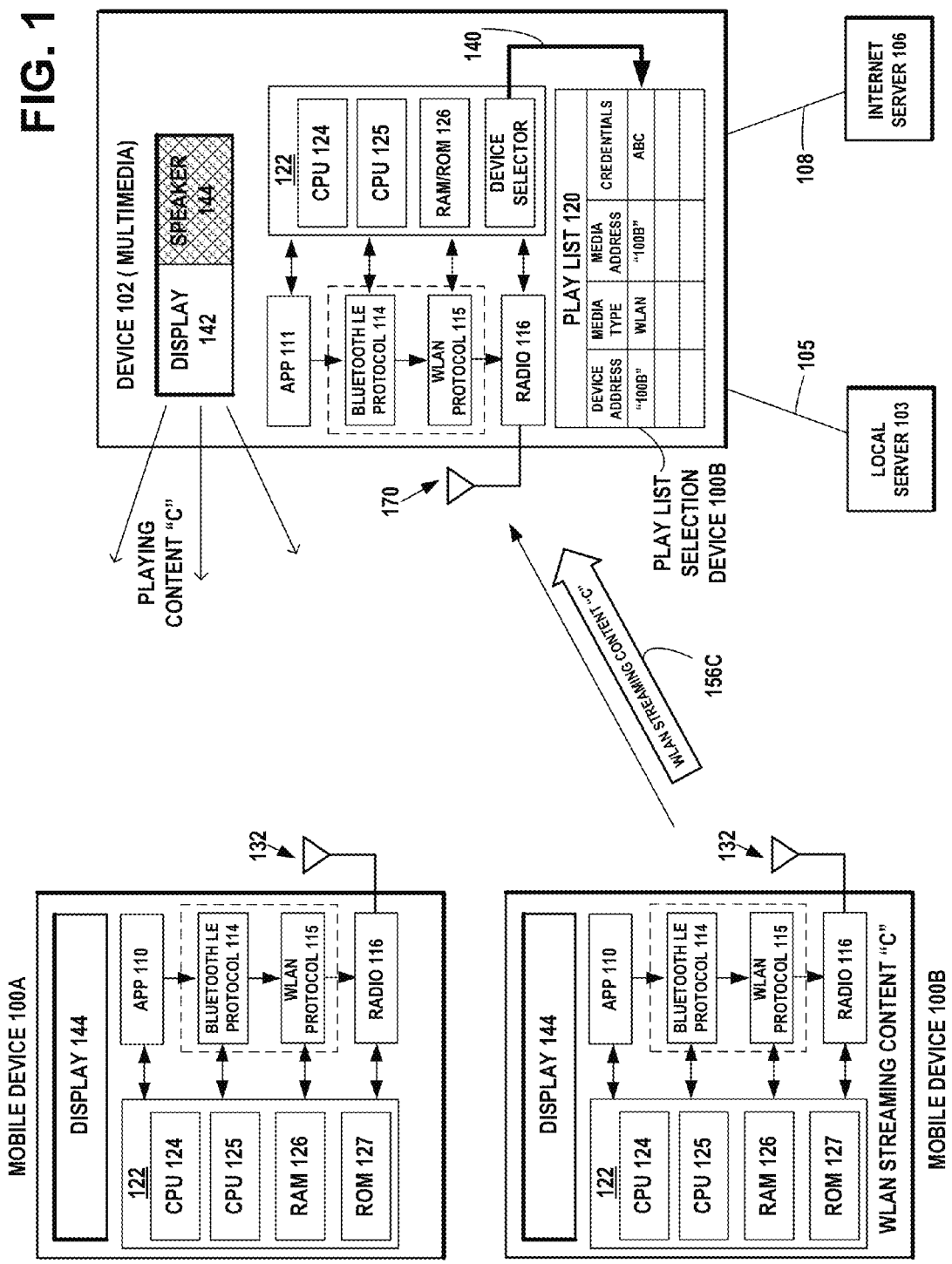

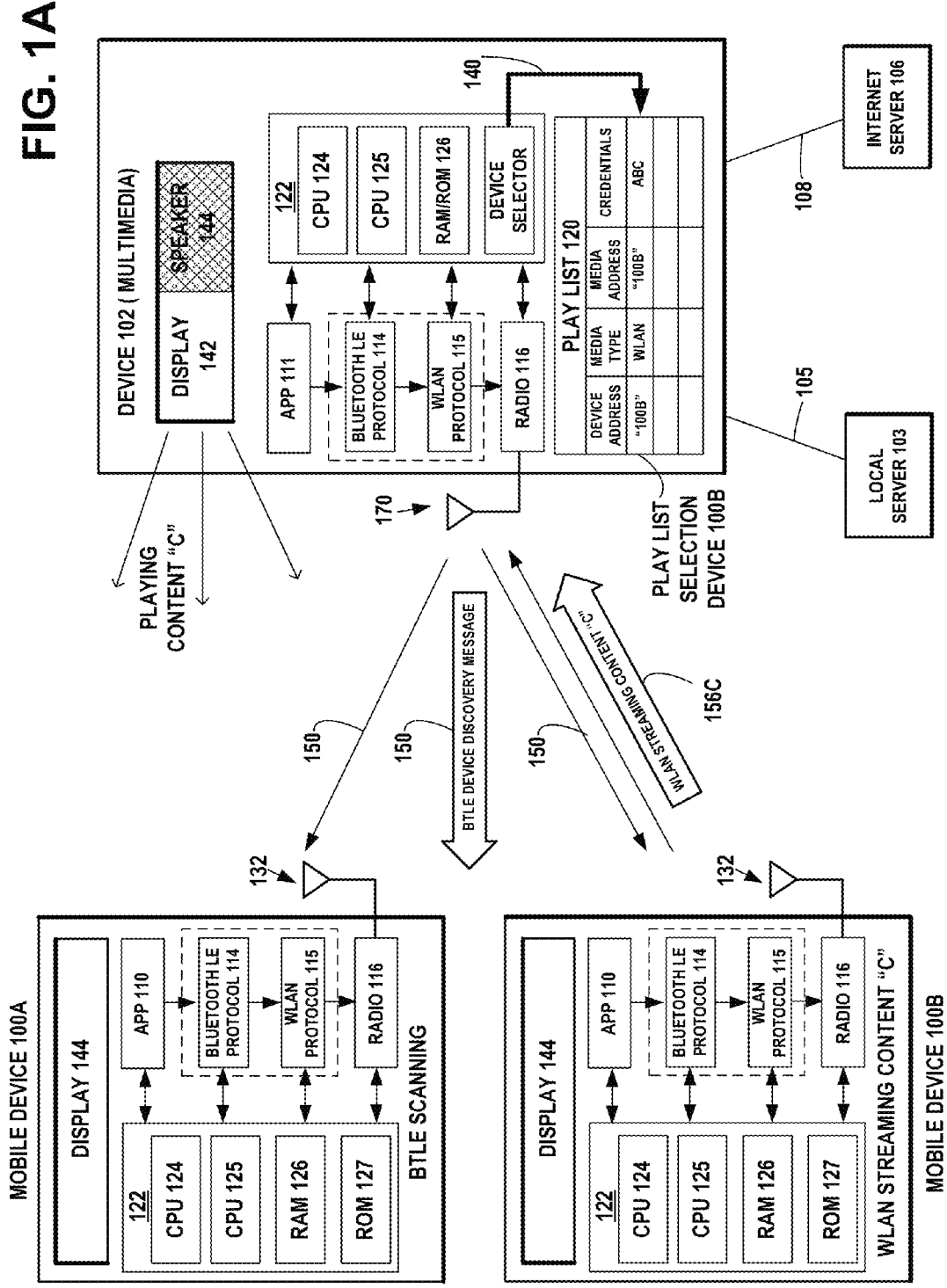

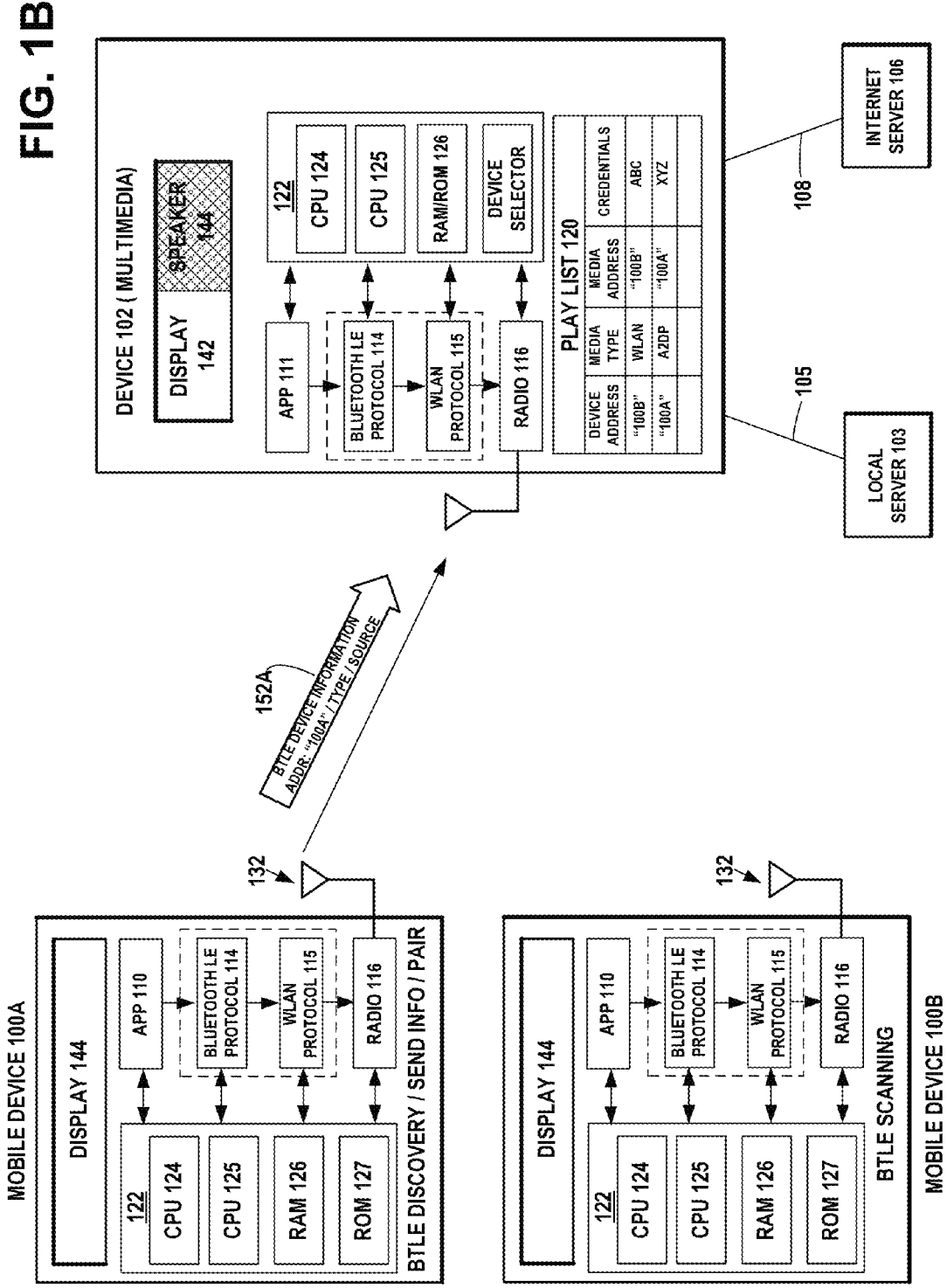

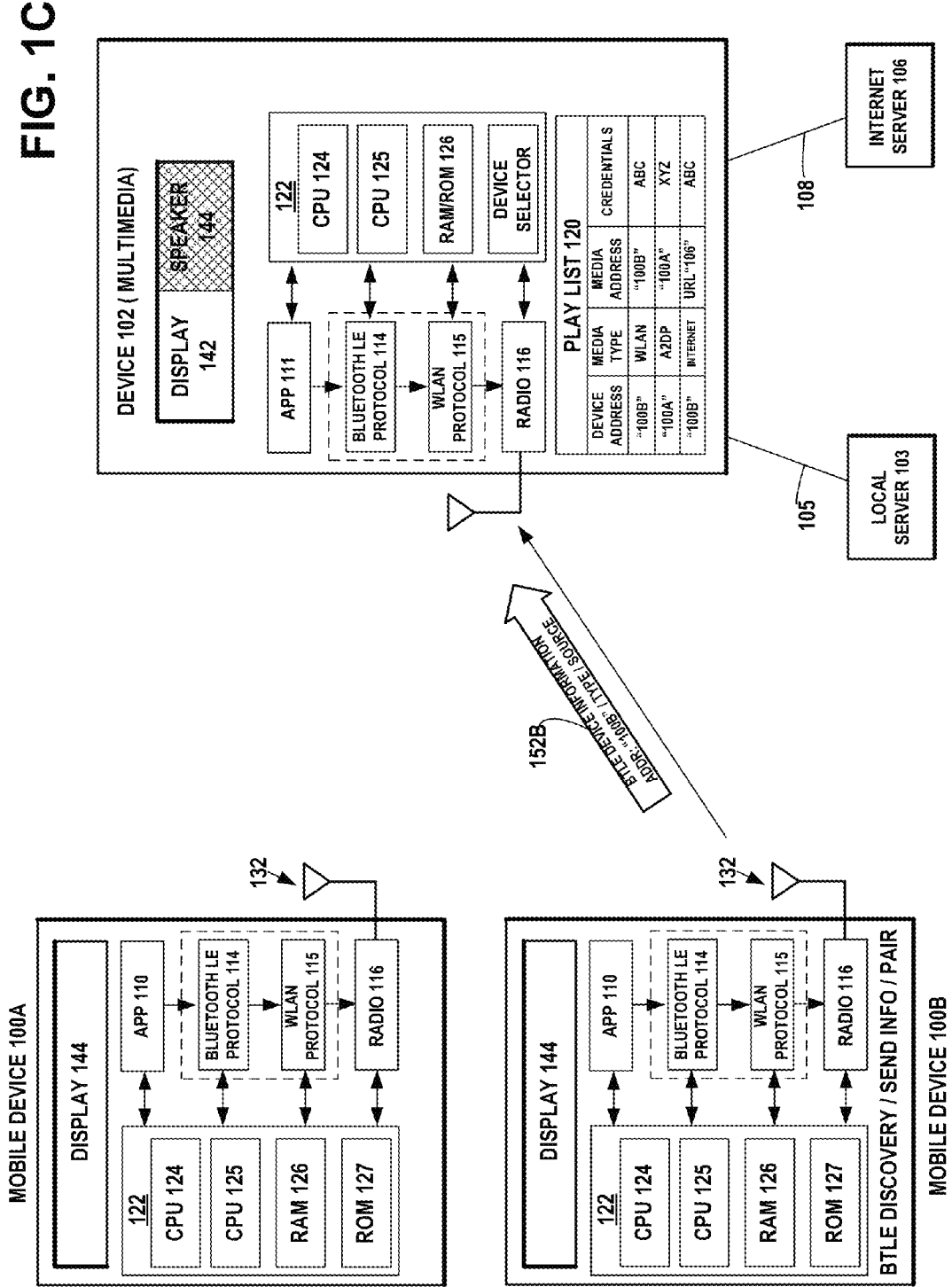

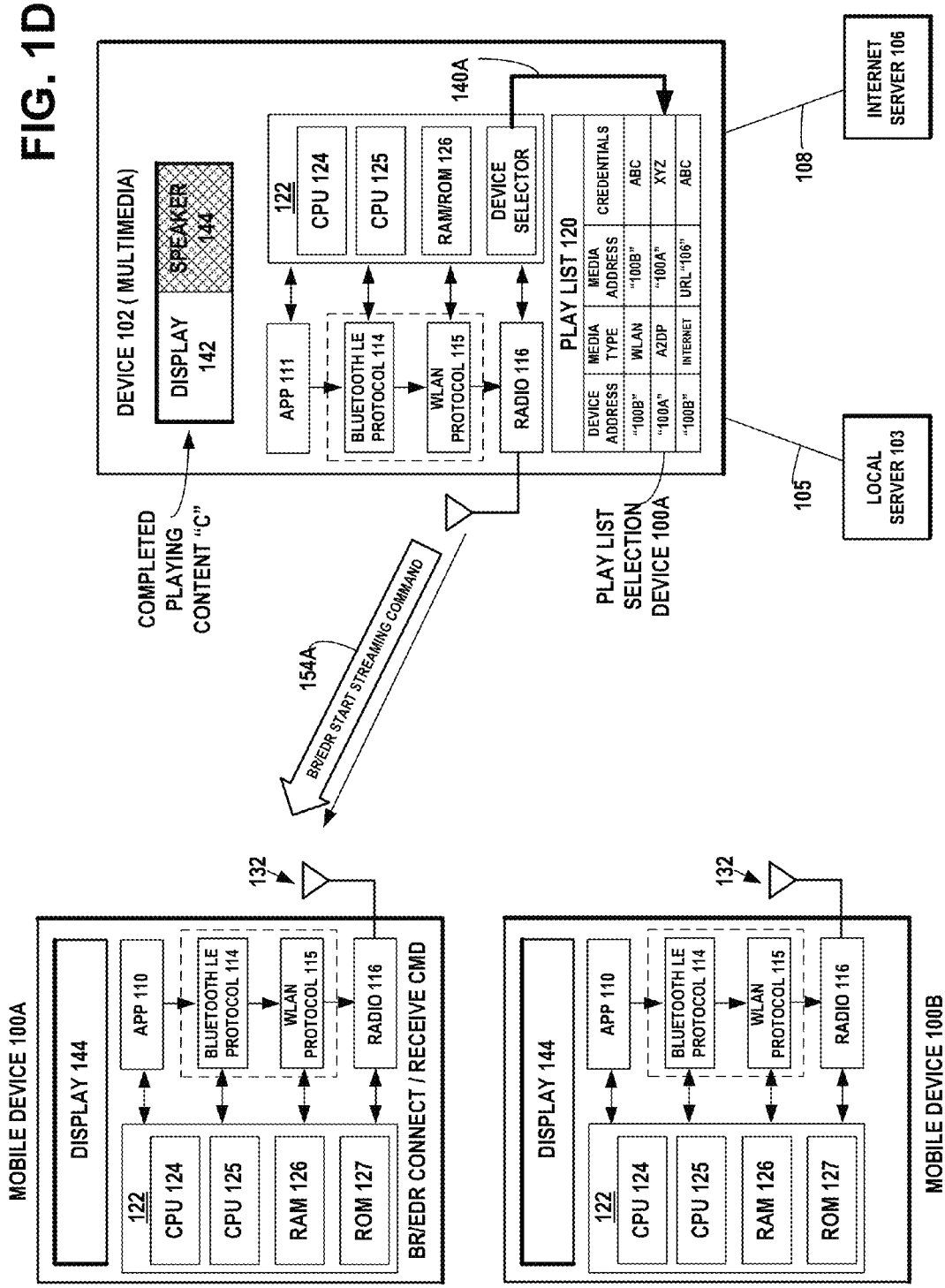

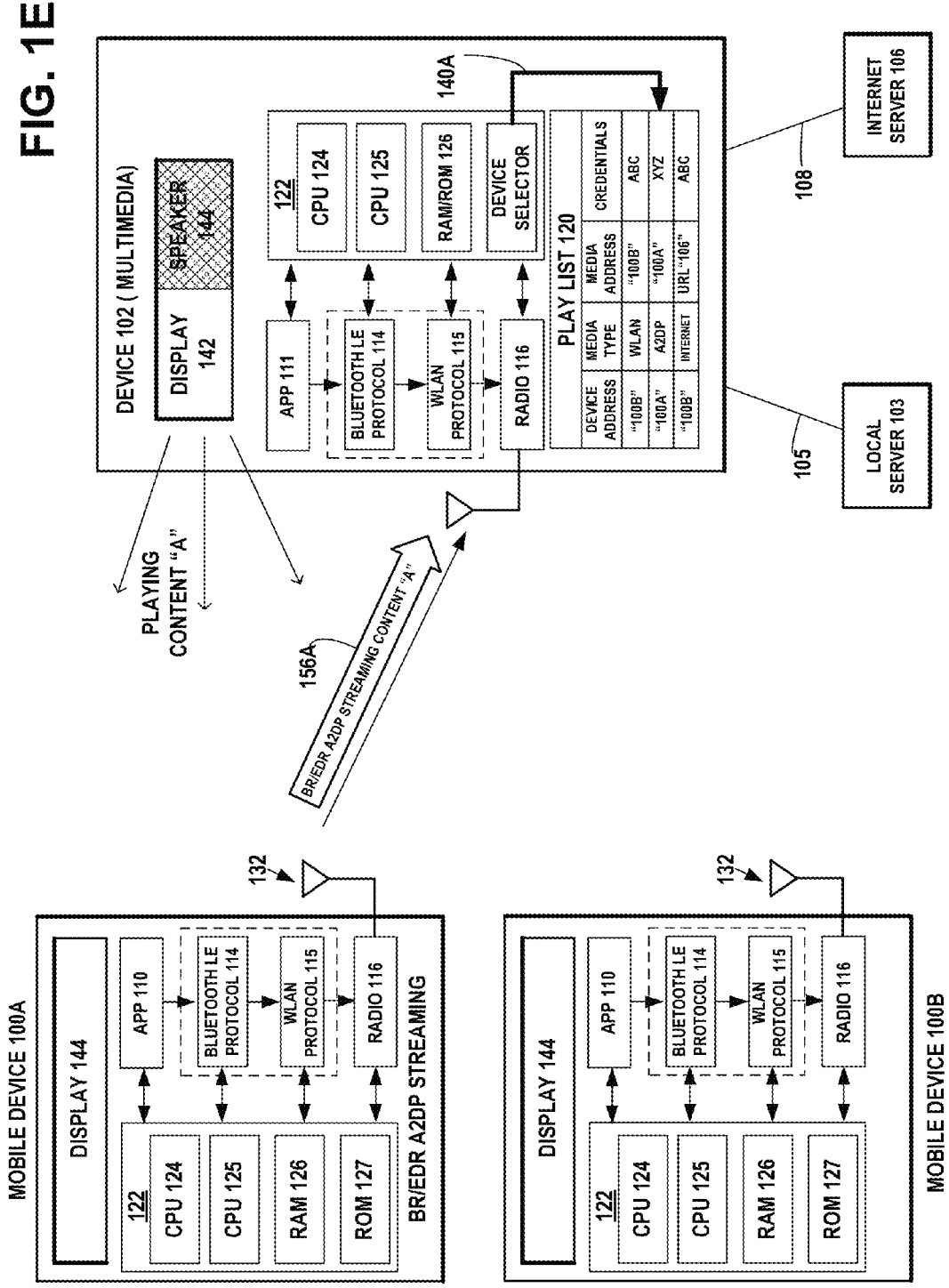

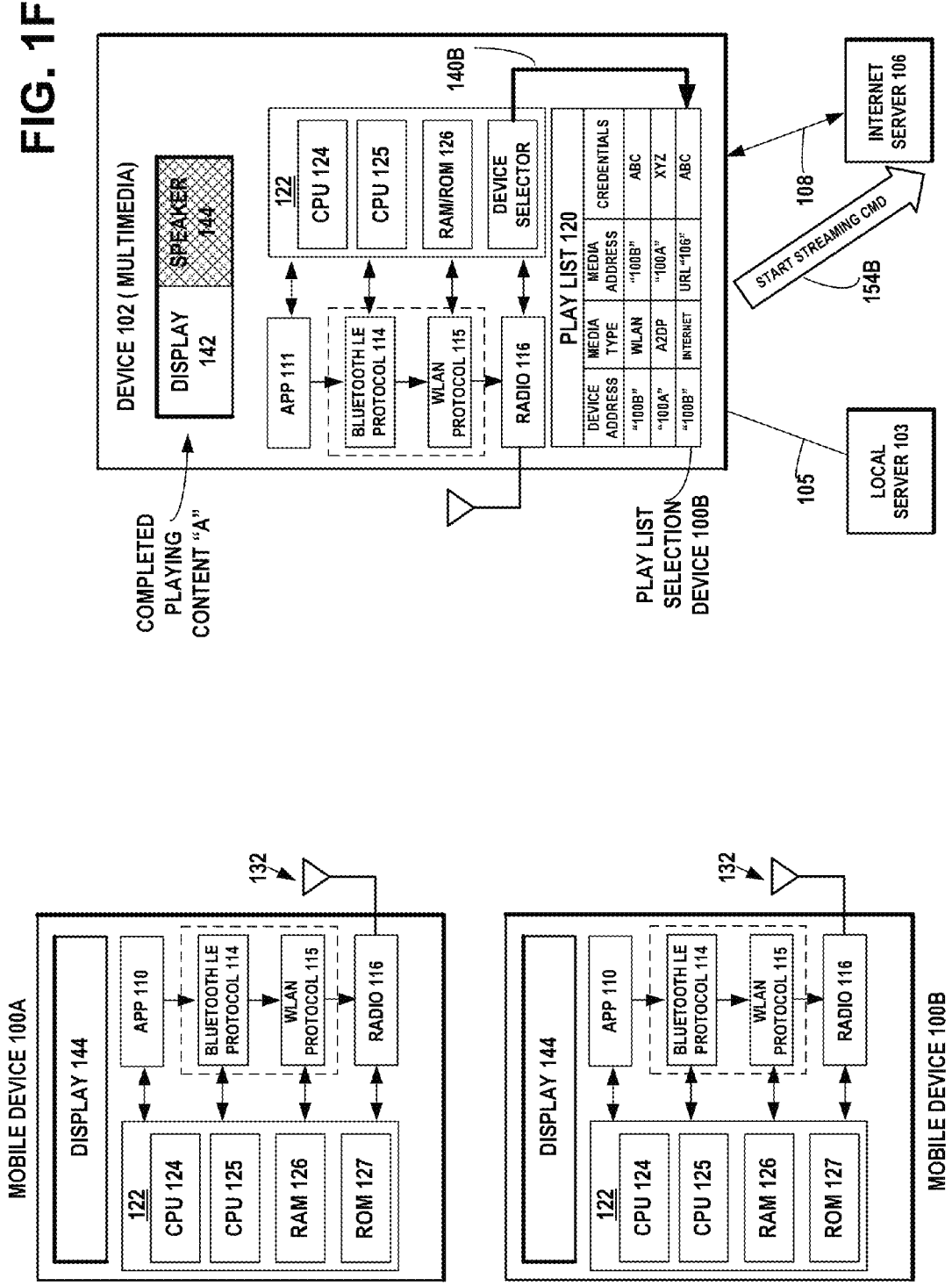

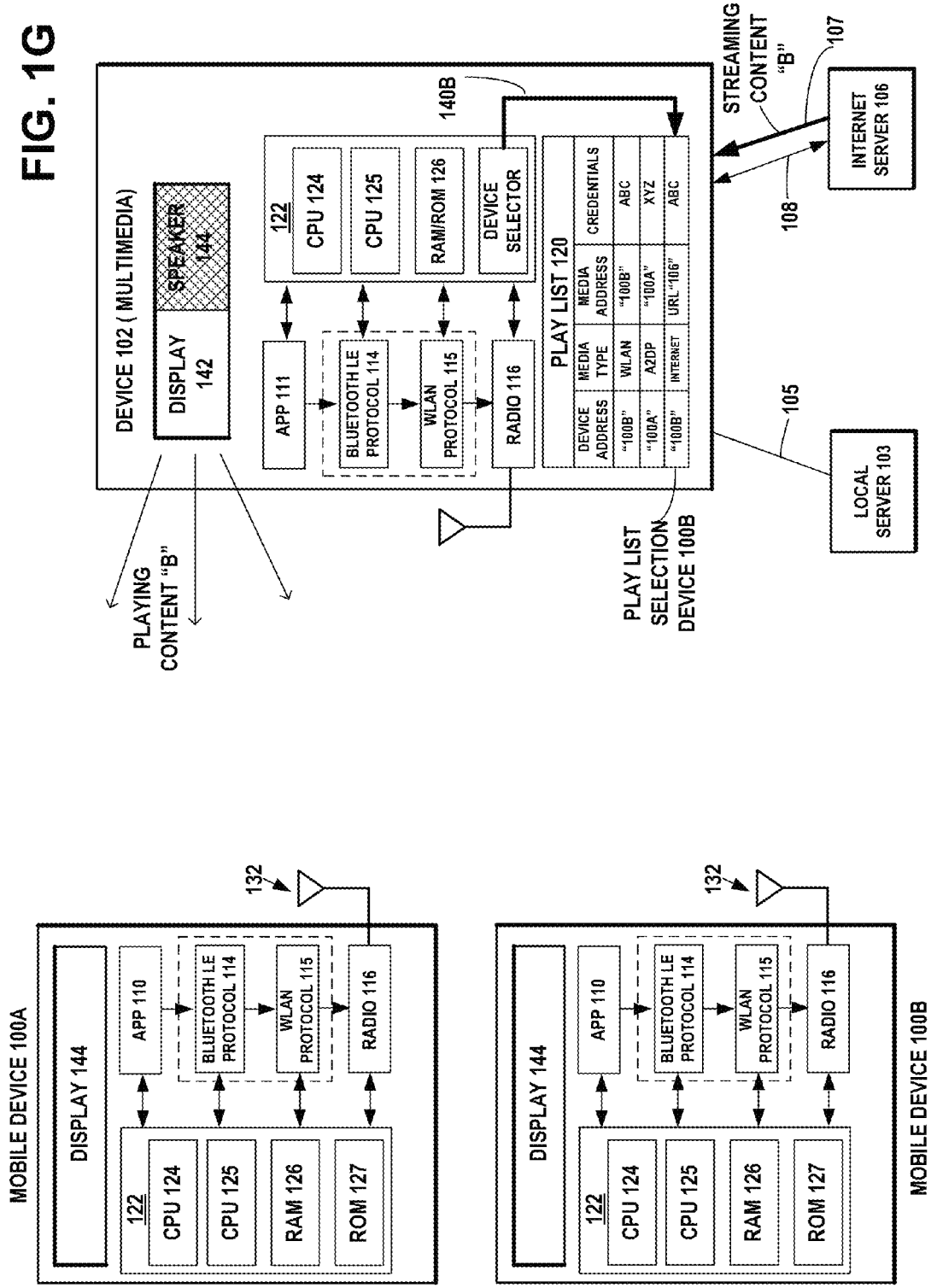

PLAY LIST
120

| Device address | Media type | Media address | Credentials |
|---|---|---|---|
| A(aa:bb:cc:dd:ee:ff) | A2DP | N/A | N/A |
| B(bb:cc:dd:ee:ff:dd) | DLNA Audio | srv://home/media/audio/disco.mp3 | N/A |
| C(cc:dd:ee:ff:gg:hh) | Spotify Stream | spotify:track:1SdTrIWIiMVYNKJPfuzOFC | spotifyuserid: discojoe<br>password: xxxxxx |

FIG. 7

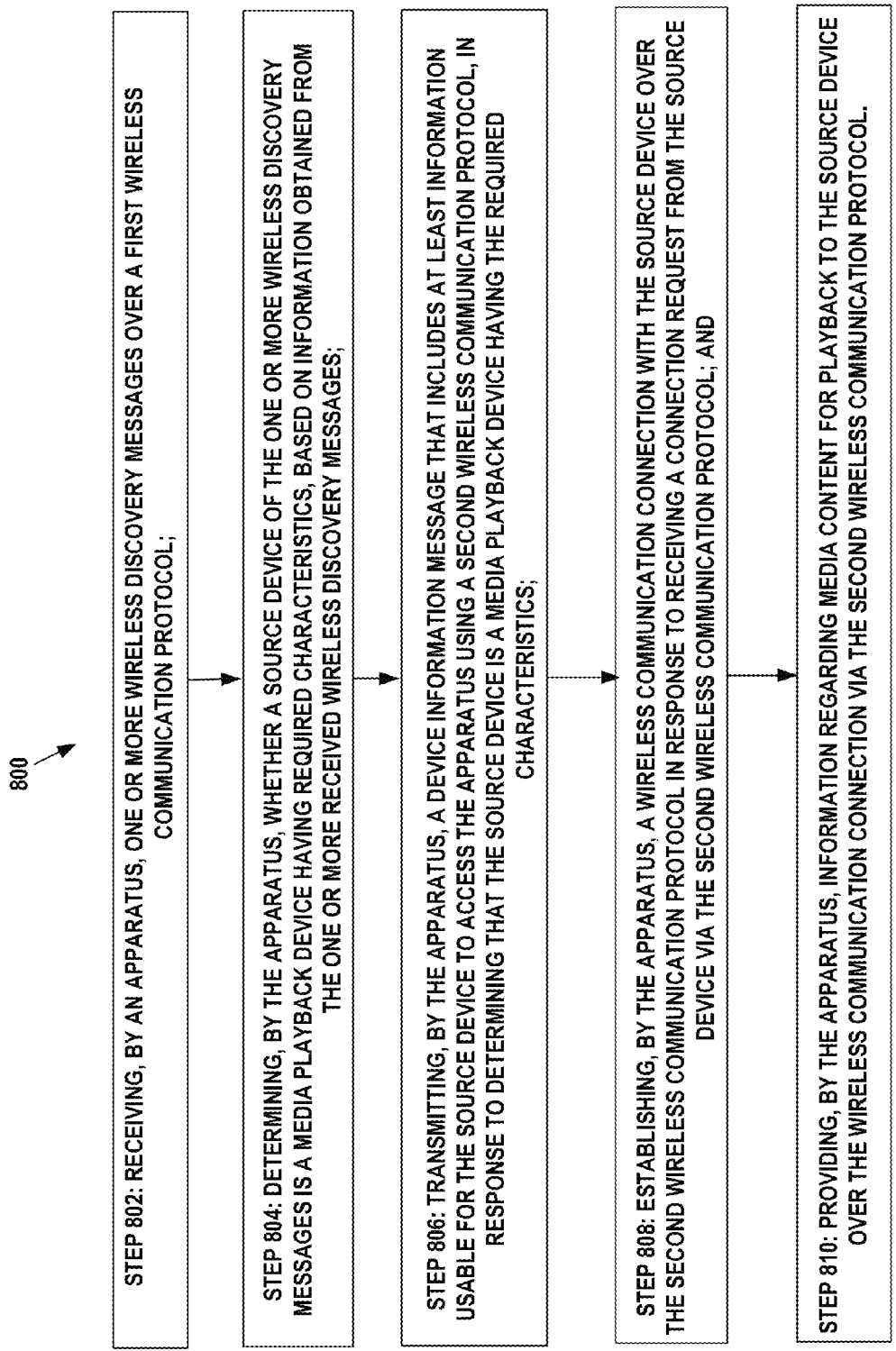

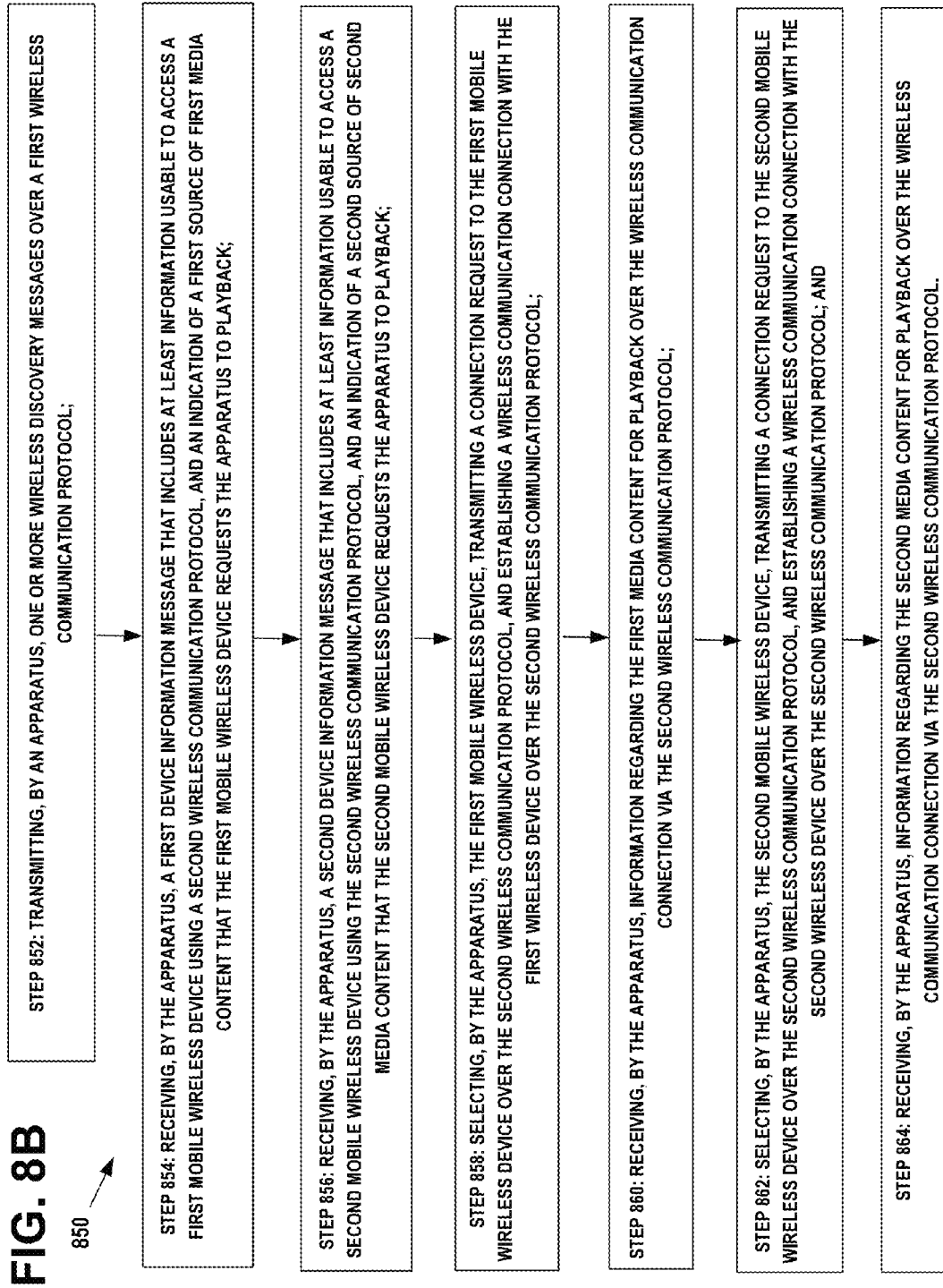

METHOD, APPARATUS, AND COMPUTER PROGRAM PRODUCT FOR MEDIA CONTROL FOR MULTIPLE DEVICES

FIELD

The technology field relates to controlling of media delivery and usage based on received information of detected apparatuses.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

One example of a wireless short-range communication technology is the Bluetooth™ Low Energy. The Bluetooth™ Core Specification, Version 4.0, Bluetooth™ SIG, Jun. 30, 2010 (incorporated herein by reference), includes the Bluetooth LE protocol for products that require lower power consumption, lower complexity, and lower cost than would be possible using the Bluetooth basic rate/enhanced data rate (BR/EDR) protocol. Bluetooth LE is designed for applications not requiring high data rate, but a very-low power idle mode and a simple device discovery.

SUMMARY

Method, apparatus, and computer program product example embodiments enhance wireless communications device discovery processes.

An example embodiment of the invention includes a method comprising:

receiving, by an apparatus, one or more wireless discovery messages over a first wireless communication protocol;

determining, by the apparatus, whether a source device of the one or more wireless discovery messages is a media playback device having required characteristics, based on information obtained from the one or more received wireless discovery messages;

transmitting, by the apparatus, a device information message that includes at least information usable for the source device to access the apparatus using a second wireless communication protocol, in response to determining that the source device is a media playback device having the required characteristics;

establishing, by the apparatus, a wireless communication connection with the source device over the second wireless communication protocol in response to receiving a connection request from the source device via the second wireless communication protocol; and providing, by the apparatus, information regarding media content for playback to the source device over the wireless communication connection via the second wireless communication protocol.

An example embodiment of the invention includes a method comprising:

wherein the first wireless communication protocol is the Bluetooth Low Energy protocol and the second wireless communication protocol is one of Bluetooth basic rate/ enhanced data rate (BR/EDR) protocol or IEEE 802.11 wireless local area network protocol.

An example embodiment of the invention includes a method comprising:

indicating, by the apparatus, in the device information message that a source of the media content is the apparatus;

receiving, by the apparatus, a start streaming command from the wireless device; and transmitting, by the apparatus, the media content to the wireless device over the second wireless communication protocol, in response to the receiving of the start streaming command.

An example embodiment of the invention includes a method comprising:

indicating, by the apparatus, in the device information message that a source of the media content is a server at a remote location; and providing, by the apparatus, necessary authentication or authorization information to the media playback device for allowing the media playback device to fetch the media content from the remote server.

An example embodiment of the invention includes a method comprising:

wherein the required characteristics of the media playback device include at least one of:

audio playback characteristics,
video playback characteristics,
gaming characteristics,
the media stream format characteristics,
second wireless communication protocol characteristics,
Internet connection characteristics, and
local server characteristics.

An example embodiment of the invention includes a method comprising:

transmitting, by an apparatus, one or more wireless discovery messages over a first wireless communication protocol;

receiving, by the apparatus, a first device information message that includes at least information usable to access a first mobile wireless device using a second wireless communication protocol, and an indication of a first source of first media content that the first mobile wireless device requests the apparatus to playback;

receiving, by the apparatus, a second device information message that includes at least information usable to access a second mobile wireless device using the second wireless communication protocol, and an indication of a second source of second media content that the second mobile wireless device requests the apparatus to playback;

selecting, by the apparatus, the first mobile wireless device, transmitting a connection request to the first mobile wireless device over the second wireless communication protocol, and establishing a wireless communication connection with the first wireless device over the second wireless communication protocol;

receiving, by the apparatus, information regarding the first media content for playback over the wireless communication connection via the second wireless communication protocol;

selecting, by the apparatus, the second mobile wireless device, transmitting a connection request to the second mobile wireless device over the second wireless communication protocol, and establishing a wireless communication connection with the second wireless device over the second wireless communication protocol; and receiving, by the apparatus, information regarding the second media content for playback over the wireless communication connection via the second wireless communication protocol.

An example embodiment of the invention includes a method comprising:

wherein the first wireless communication protocol is the Bluetooth Low Energy protocol and the second wireless communication protocol is one of Bluetooth basic rate/enhanced data rate (BR/EDR) protocol or IEEE 802.11 wireless local area network protocol.

An example embodiment of the invention includes a method comprising:

wherein the device information message indicates that the first source of the first media content is the first mobile wireless device;

transmitting, by the apparatus, a start streaming command to the first wireless device; and receiving, by the apparatus, the media content from the first wireless device over the second wireless communications protocol, in response to the start streaming command.

An example embodiment of the invention includes a method comprising:

wherein the device information message indicates that the first source of the first media content is a server at an address;

transmitting, by the apparatus, a start streaming command to the server at the address; and receiving, by the apparatus, the media content from the server, in response to the start streaming command.

An example embodiment of the invention includes a method comprising:

maintaining, by the apparatus, a play list from which the apparatus selects the first media content followed by the second media content.

An example embodiment of the invention includes a method comprising:

wherein the device information message indicates that the first source of the first media content is an internet server at an internet address;

transmitting, by the apparatus, a start streaming command to the internet server at the internet address; and receiving, by the apparatus, the media content from the internet server, in response to the start streaming command.

An example embodiment of the invention includes a method comprising:

wherein the device information message indicates that the first source of the first media content is an internet server at an internet address;

receiving, by the apparatus, necessary authentication or authorization information for allowing the apparatus to fetch the first media content from the internet server.

An example embodiment of the invention includes an apparatus comprising:

at least one processor;

at least one memory including computer program code;

the at least one memory and the computer program code configured to, with the at least one processor, cause the apparatus at least to:

receive one or more wireless discovery messages over a first wireless communication protocol;

determine whether a source device of the one or more wireless discovery messages is a media playback device having required characteristics, based on information obtained from the one or more received wireless discovery messages;

transmit a device information message that includes at least information usable for the source device to access the apparatus using a second wireless communication protocol, in response to determining that the source device is a media playback device having the required characteristics;

establish a wireless communication connection with the source device over the second wireless communication protocol in response to receiving a connection request from the source device via the second wireless communication protocol; and provide information regarding media content for playback to the source device over the wireless communication connection via the second wireless communication protocol.

An example embodiment of the invention includes an apparatus comprising:

wherein the first wireless communication protocol is the Bluetooth Low Energy protocol and the second wireless communication protocol is one of Bluetooth basic rate/enhanced data rate (BR/EDR) protocol or IEEE 802.11 wireless local area network protocol.

An example embodiment of the invention includes an apparatus comprising:

the at least one memory and the computer program code configured to, with the at least one processor, cause the apparatus at least to:

indicate in the device information message that a source of the media content is the apparatus;

receive a start streaming command from the wireless device; and transmit the media content to the wireless device over the second wireless communication protocol, in response to the receiving of the start streaming command.

An example embodiment of the invention includes an apparatus comprising:

the at least one memory and the computer program code configured to, with the at least one processor, cause the apparatus at least to:

indicate in the device information message that a source of the media content is a server at an address;

provide necessary authentication or authorization information to the media playback device for allowing the media playback device to fetch the media content from the remote server.

An example embodiment of the invention includes an apparatus comprising:

at least one processor;

at least one memory including computer program code;

the at least one memory and the computer program code configured to, with the at least one processor, cause the apparatus at least to:

transmit one or more wireless discovery messages over a first wireless communication protocol;

receive a first device information message that includes at least information usable to access a first mobile wireless device using a second wireless communication protocol, and an indication of a first source of first media content that the first mobile wireless device requests the apparatus to playback;

receive a second device information message that includes at least information usable to access a second mobile wireless device using the second wireless communication protocol, and an indication of a second source of second media content that the second mobile wireless device requests the apparatus to playback;

select the first mobile wireless device, transmit a connection request to the first mobile wireless device over the second wireless communication protocol, and establish a wireless communication connection with the first wireless device over the second wireless communication protocol;

receive information regarding the first media content for playback over the wireless communication connection via the second wireless communication protocol;

select the second mobile wireless device, transmit a connection request to the second mobile wireless device over the second wireless communication protocol, and establish a wireless communication connection with the second wireless device over the second wireless communication protocol; and receive information regarding the second media content for playback over the wireless communication connection via the second wireless communication protocol.

An example embodiment of the invention includes an apparatus comprising:

wherein the first wireless communication protocol is the Bluetooth Low Energy protocol and the second wireless communication protocol is one of Bluetooth basic rate/enhanced data rate (BR/EDR) protocol or IEEE 802.11 wireless local area network protocol.

An example embodiment of the invention includes an apparatus comprising:

wherein the device information message indicates that the first source of the first media content is the first mobile wireless device;

the at least one memory and the computer program code configured to, with the at least one processor, cause the apparatus at least to:

transmit a start streaming command to the first wireless device; and receive the media content from the first wireless device over the second wireless communications protocol, in response to the start streaming command.

An example embodiment of the invention includes an apparatus comprising:

wherein the device information message indicates that the first source of the first media content is a server at an address;

the at least one memory and the computer program code configured to, with the at least one processor, cause the apparatus at least to:

transmit a start streaming command to the server at the address; and receive the media content from the server, in response to the start streaming command.

An example embodiment of the invention includes a computer program product comprising computer executable program code recorded on a computer readable, non-transitory storage medium, the computer executable program code comprising:

code for receiving, by an apparatus, one or more wireless discovery messages over a first wireless communication protocol;

code for determining, by the apparatus, whether a source device of the one or more wireless discovery messages is a media playback device having required characteristics, based on information obtained from the one or more received wireless discovery messages;

code for transmitting, by the apparatus, a device information message that includes at least information usable for the source device to access the apparatus using a second wireless communication protocol, in response to determining that the source device is a media playback device having the required characteristics;

code for establishing, by the apparatus, a wireless communication connection with the source device over the second wireless communication protocol in response to receiving a connection request from the source device via the second wireless communication protocol; and code for providing, by the apparatus, information regarding media content for playback to the source device over the wireless communication connection via the second wireless communication protocol.

An example embodiment of the invention includes a computer program product comprising computer executable program code recorded on a computer readable, non-transitory storage medium, the computer executable program code comprising:

code for transmitting, by an apparatus, one or more wireless discovery messages over a first wireless communication protocol;

code for receiving, by the apparatus, a first device information message that includes at least information usable to access a first mobile wireless device using a second wireless communication protocol, and an indication of a first source of first media content that the first mobile wireless device requests the apparatus to playback;

code for receiving, by the apparatus, a second device information message that includes at least information usable to access a second mobile wireless device using the second wireless communication protocol, and an indication of a second source of second media content that the second mobile wireless device requests the apparatus to playback;

code for selecting, by the apparatus, the first mobile wireless device, transmitting a connection request to the first mobile wireless device over the second wireless communication protocol, and establishing a wireless communication connection with the first wireless device over the second wireless communication protocol;

code for receiving, by the apparatus, information regarding the first media content for playback over the wireless communication connection via the second wireless communication protocol;

code for selecting, by the apparatus, the second mobile wireless device, transmitting a connection request to the second mobile wireless device over the second wireless communication protocol, and establishing a wireless communication connection with the second wireless device over the second wireless communication protocol; and code for receiving, by the apparatus, information regarding the second media content for playback over the wireless communication connection via the second wireless communication protocol.

The resulting example embodiments enhance wireless communications device discovery processes.

DESCRIPTION OF THE FIGURES

FIG. 1 is an illustration of an example embodiment of a network of two mobile wireless devices and a wireless multimedia playback device, wherein a second mobile wireless device is connected to the wireless multimedia playback device and is streaming multimedia content via a second wireless communication protocol, for example a wireless local area network (WLAN) wireless communication protocol, to the multimedia playback device that is playing the multimedia content, in accordance with at least one embodiment of the present invention.

FIG. 1A is an illustration of an example embodiment of the network of FIG. 1, wherein while the multimedia playback device is connected to the second mobile wireless device, is receiving the streaming multimedia content via the second wireless communication protocol, and is playing the multimedia content, the multimedia playback device is transmitting one or more wireless discovery messages via a first wireless communication protocol, for example a wireless personal area network wireless communication protocol, for example Bluetooth Low energy (BTLE). The wireless discovery messages indicate the source is a media playback device having specified characteristics. The media may include multimedia content. A first mobile wireless device receives one or more wireless discovery messages and determines that the sender is a multimedia playback device having required characteristics, based on information obtained from the one or more received wireless discovery messages, in accordance with at least one embodiment of the present invention.

FIG. 1B is an illustration of the example embodiment of the network of FIG. 1A, wherein, in response to determining that the wireless device is a multimedia playback device having the required characteristics, the first mobile wireless device transmits a device information message via the first wireless communication protocol, for example a wireless personal area network wireless communication protocol, for example Bluetooth Low energy (BTLE), which includes at least its own address, the media type as Bluetooth BR/EDR Advanced Audio Distribution Profile (A2DP), and an indication that the source of the multimedia content is the first mobile wireless device, itself. The multimedia playback device maintains a play list that it updates with the address of the first mobile wireless device and the indication of the source of multimedia content is the first mobile wireless device, itself, in accordance with at least one embodiment of the present invention.

FIG. 1C is an illustration of the example embodiment of the network of FIG. 1B, wherein the second mobile wireless device, in response to determining that the wireless device is a multimedia playback device having the required characteristics, transmits a second device information message via the first wireless communication protocol, for example a wireless personal area network wireless communication protocol, for example Bluetooth Low energy (BTLE), which includes at least its own address, the media type as Internet IP, and an indication that the source of second multimedia content is an internet server. The multimedia playback device maintains a play list that it updates with the address of the second mobile wireless device and the indication that the source of the second multimedia content is the internet server, in accordance with at least one embodiment of the present invention.

FIG. 1D is an illustration of the example embodiment of the network of FIG. 1C, wherein the multimedia playback device selects the first mobile wireless device from its play list and determines that the source of the first multimedia content is the first mobile wireless device, itself. The multimedia playback device transmits a Bluetooth BR/EDR connection request and start streaming command to the first wireless device, in accordance with at least one embodiment of the present invention.

FIG. 1E is an illustration of the example embodiment of the network of FIG. 1D, wherein the first mobile wireless device receives the start streaming command from the multimedia playback device, and in response, transmits the Bluetooth BR/EDR Advanced Audio Distribution Profile (A2DP) first multimedia content to the multimedia playback device. The multimedia playback device plays back the first multimedia content, for example as a jukebox, in accordance with at least one embodiment of the present invention.

FIG. 1F is an illustration of the example embodiment of the network of FIG. 1E, wherein the multimedia playback device completes playing back the first multimedia content. In response, the multimedia playback device selects the second mobile wireless device from its play list and determines that the source of the second multimedia content is an internet server at an internet address. In response, the multimedia playback device transmits a start streaming command to the internet server at the internet address, in accordance with at least one embodiment of the present invention.

FIG. 1G is an illustration of the example embodiment of the network of FIG. 1F, wherein the multimedia playback device receives the second multimedia content from the internet server. The multimedia playback device plays back the second multimedia content, for example as a jukebox, in accordance with at least one embodiment of the present invention.

FIG. 7 is an illustration of an example play list in the multimedia playback device, in accordance with at least one embodiment of the present invention.

FIG. 8A is an illustration of an example flow diagram of an example process in the mobile wireless device carrying out the example operations, in accordance with at least one embodiment of the present invention.

FIG. 8B is an illustration of an example flow diagram of an example process in the wireless multimedia device, carrying out the example operations, in accordance with at least one embodiment of the present invention.

DISCUSSION OF EXAMPLE EMBODIMENTS OF THE INVENTION

Figure 2A:
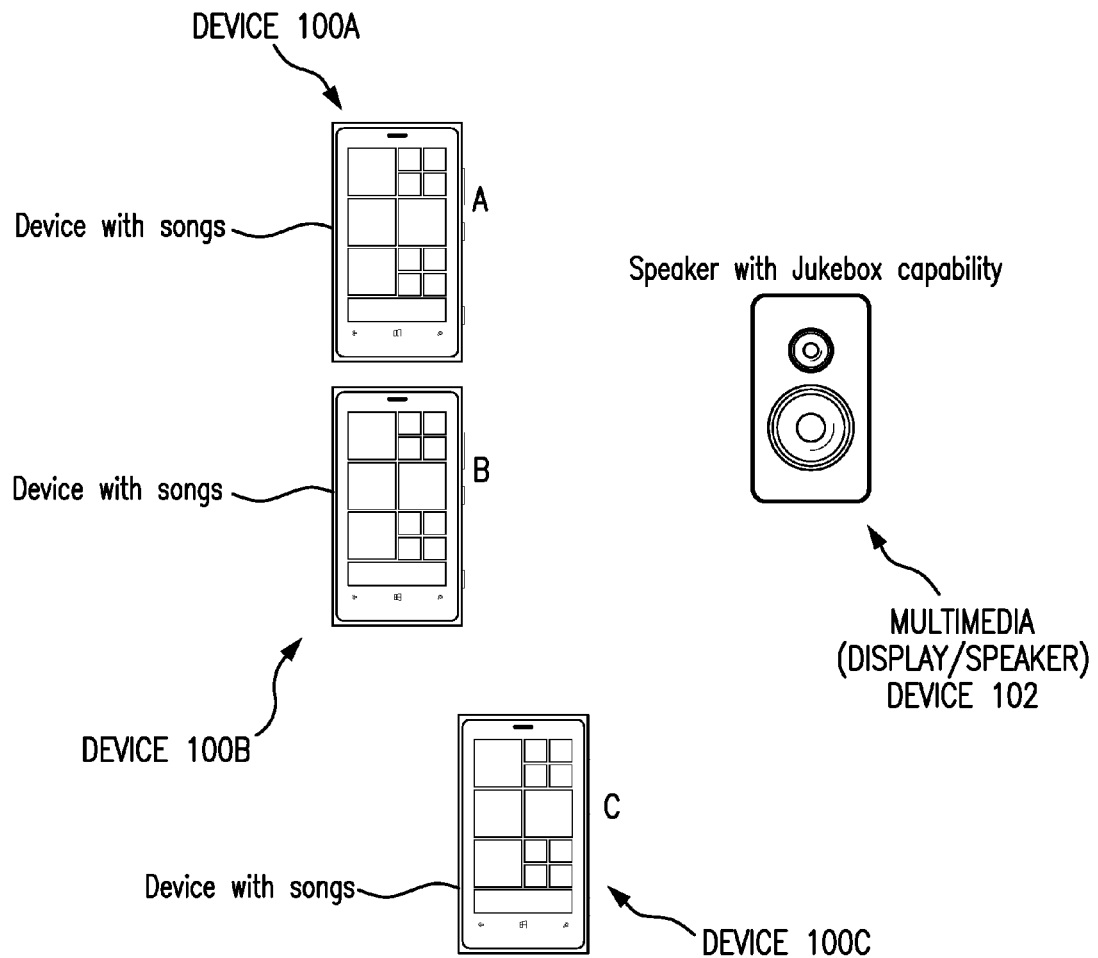
FIG. 2A is an illustration of an example embodiment of a network setup for three mobile wireless devices and a wireless multimedia playback device operating as a jukebox, similar to that shown in FIG. 1A, in accordance with at least one embodiment of the present invention.

This section is organized into the following topics:
A. Wireless Short-Range Communication Networks
B. Bluetooth™ Low Energy (LE) Communication Technology
C. WLAN Communication Technology
D. Media Control for Multiple Devices A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), and near field communication technologies, such as radio frequency identification (RFID) and near field communication (NFC) technology that enable contactless identification and interconnection of wireless devices. Bluetooth Technology provides an example of wireless short-range communication establishment.

B. Bluetooth™ Low Energy (LE) Communication Technology

The Bluetooth™ Core Specification, Version 4.0 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, each having a bandwidth of 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 10 octets to a maximum of 47 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.0, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCON_N IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

The scanner device, also referred to as the initiator device, that receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the scanner/initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCON-N_IND packets are sent by the Link Layer. The non-connectable undirected event type allows a scanner to receive information contained in the ADV_NONCON-N_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.0, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth Specification V4.0, Bluetooth LE device discovery involves different operational processes for devices with different roles. In particular:

Slave Device, being an advertiser, performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Master Device, being an initiator/scanner, performs the initiating/scanning process. An initiating/scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator/scanner successfully discovers the advertising device. For the initiator, it can directly send back a "CONN_REQ" to establish a connection with that advertiser. For a scanner, it can send out a "SCAN_REQ" to ask for more information from that advertiser.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

C. WLAN Communication Technology

The IEEE 802.11 standard specifies methods and techniques of an exemplary wireless local area network (WLAN) operation. Examples include the IEEE 802.11a, 802.11b, 802.11g and 802.11n wireless local area network specifications, which have been a staple technology for traditional WLAN applications in the 2.4 GHz and 5 GHz ISM bands. The various amendments to the IEEE 802.11 standard were consolidated for IEEE 802.11a, b, d, e, g, h, i, j, k, n, r, s, u, v, and z protocols, into the base standard IEEE 802.11-2012, Wireless Medium Access Control (MAC) and Physical Layer (PHY) Specifications, February 2012. Applications of these IEEE 802.11 standards include products such as consumer electronics, telephones, personal computers, and access points for both for home and office.

D. Media Control for Multiple Devices

It would be desirable to have a media device, such as an audio speaker, video device or gaming device, that is able to sequentially play content requested by multiple users' devices, the content originating from diverse media sources. The media may include multimedia content. In accordance with an example embodiment of the invention, a multimedia playback device, such as an audio speaker, video device or gaming device, controls the multimedia stream source connection according to the stream's status. For example, when a current audio stream ends (playback of one song completes), the playback device switches to the next audio source and the previous source is disconnected. The multimedia source devices are added by means of a Bluetooth Low Energy (BLE) connection. Multimedia content may be streamed from a local source over Bluetooth or WLAN radios. Alternately, multimedia content may be streamed from the Internet over an IP connection. In the case of local streaming, content may originate, for example, in the Internet, but it is local from point of view of the playback device, if it is streamed from a local device using a Bluetooth or WLAN connection address given over the Bluetooth LE radio. In the case of Internet-based streaming, the URL or other address pointer may be designated over the Bluetooth LE connection, to indicate the source of the multimedia content. For some Internet-based playback services, the user ID, service ID, or similar information may be communicated over the Bluetooth LE connection to enable the music playback from an Internet service.

FIG. 1 is an illustration of an example embodiment of a network of two mobile wireless devices 100A and 100B and a wired or wireless media playback device 102. The media may include multimedia content. The second mobile wireless device 100B is connected to the wireless multimedia playback device 102 and is streaming multimedia content "C" 156C via a second wireless communication protocol, for example a wireless local area network (WLAN) wireless communication protocol, to the multimedia playback device 102. The multimedia playback device 102 has selected (and connected) 140 to the second mobile wireless device 100B, from its play list 120. The multimedia playback device 102 is playing the multimedia content "C", in accordance with at least one embodiment of the present invention.

FIG. 1A is an illustration of an example embodiment of the network of FIG. 1, wherein while the multimedia playback device 102 is connected to the second mobile wireless device 100B, is receiving the streaming multimedia content "C" 156C via the second wireless communication protocol, and is playing the multimedia content "C", the multimedia playback device 102 is transmitting one or more wireless discovery messages 150 via a first wireless communication protocol, for example a wireless personal area network wireless communication protocol, for example Bluetooth Low energy (BTLE) wireless communication protocol, in accordance with at least one embodiment of the present invention.

A wired multimedia playback device 102 may include a wired interface, for example to the Internet or a local server 103. The multimedia playback device 102 is transmitting one or more wireless device discovery messages, such as Bluetooth LE advertising messages 150. The wireless device discovery messages 150 indicate it is a multimedia playback device 102 having specified characteristics, such as an Internet capability. A first mobile wireless device 100A receives one or more wireless discovery messages 150 and determines that the sender is a multimedia playback device having required characteristics, based on information obtained from the one or more received wireless discovery messages 150, in accordance with at least one embodiment of the present invention.

The mobile wireless device 100A or 100B, such as a smart phone, performs device discovery and receives one or more device discovery messages 150. In an example embodiment of the invention, the wireless device discovery messages 150 may be a Bluetooth™ Low Energy advertising message transmitted by the multimedia playback device 102.

Figure 9:
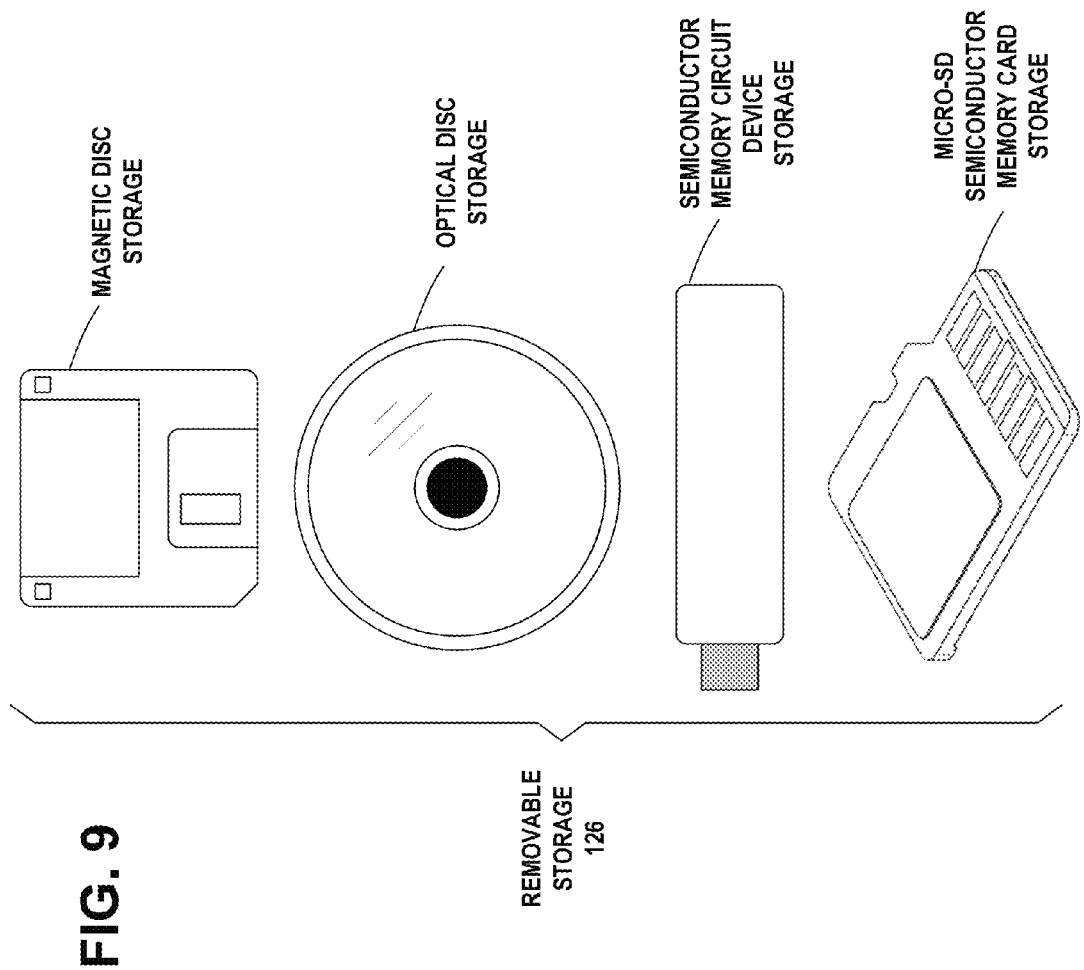
FIG. 9 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In example embodiments of the invention, the wireless mobile devices 100A and 100B and the multimedia device 102 may include a processor 122 that includes from one to many central processing units (CPUs) 124 and/or 125, a random access memory (RAM) 126, a read only memory (ROM) 127, and interface circuits to interface with one or more radio transceivers 116, antenna 132 or 170, and battery or house power sources. A smart phone may include a keypad, display 144, etc. A wireless multimedia device may include a video display device 142 and/or an audio output port 144. The RAM and ROM can be removable memory devices such as smart cards, SIMs, WIMs, semiconductor memories such as RAM, ROM, PROMS, flash memory devices, etc., as shown in FIG. 9. In an example embodiment of the invention, the Bluetooth mobile wireless devices 100A and 100B and the wireless multimedia device 102 may include the Bluetooth Low Energy (LE) protocol 114 and IEEE 802.11 WLAN protocol 115.

In an example embodiment of the invention, the multimedia playback device 102 outputs Bluetooth LE advertising packets on the advertising PHY channels in advertising events. During Bluetooth LE transmission, the RF signal is transmitted by the antenna 170.

In an example embodiment of the invention, the mobile wireless devices 100A and 100B may be, for example, a miniature device such as a key fob, smart card, jewelry, or the like. In an example embodiment of the invention, the mobile wireless devices 100A and 100B may be, for example, a relatively larger cell phone, smart phone, flip-phone, PDA, graphic pad. The mobile wireless devices 100A and 100B may also be in an automobile or other vehicle. The wireless multimedia device 102 may be, for example, audio speakers, video displays, or gaming devices that are either in a fixed position or mobile. In embodiments, the relative sizes of devices 100A, 100B and 102 may be arbitrary.

The wireless device discovery messages 150 may indicate the source is a multimedia playback device 102 having specified characteristics, such as audio playback characteristics, video playback characteristics, gaming characteristics, the multimedia stream format characteristics, second wireless communication protocol characteristics, Internet connection characteristics, and local server characteristics.

FIG. 1B is an illustration of the example embodiment of the network of FIG. 1A, wherein, in response to determining that the wireless device 102 is a multimedia playback device having the required characteristics. The first mobile wireless device 100A transmits a device information message 152A via the first wireless communication protocol, for example a wireless personal area network wireless communication protocol, for example Bluetooth Low energy (BTLE), which includes at least its own address (or access information, such as the device's wireless interface address), the media type as Bluetooth BR/EDR Advanced Audio Distribution Profile (A2DP), and an indication that the source of the multimedia content is the first mobile wireless device 100A, itself. The multimedia playback device 102 maintains a play list 120 that it updates with the address of the first mobile wireless device 100A and the indication of the source of multimedia content is the first mobile wireless device 100A, itself, in accordance with at least one embodiment of the present invention.

FIG. 1C is an illustration of the example embodiment of the network of FIG. 1B, wherein the second mobile wireless device 100B, in response to determining that the wireless device 102 is a multimedia playback device having the required characteristics, transmits a second device information message 152B via the first wireless communication protocol, for example a wireless personal area network wireless communication protocol, for example Bluetooth Low energy (BTLE), which includes at least its own address (or access information), the media type as Internet IP, and an indication that the source of second multimedia content is a local server 103 over a link 105 or an internet server 106 over a link 108. The second device information message 152B may also provide necessary authentication or authorization information to the multimedia playback device 102 for allowing the multimedia playback device 102 to fetch the multimedia content from the remote server 106. The multimedia playback device 102 maintains the play list 120 that it updates with the address of the second mobile wireless device 100B and the indication that the source of the second multimedia content is the internet server 106, in accordance with at least one embodiment of the present invention.

FIG. 1D is an illustration of the example embodiment of the network of FIG. 1C, wherein the multimedia playback device 102 selects 140A the first mobile wireless device 100A from its play list 120. The multimedia playback device determines that the source of the first multimedia content is the first mobile wireless device 100A, itself. In response, the multimedia playback device 102 transmits a Bluetooth BR/EDR connection request and start streaming command 154A to the first wireless device 100A, in accordance with at least one embodiment of the present invention.

FIG. 1E is an illustration of the example embodiment of the network of FIG. 1D, wherein the first mobile wireless device 100A receives the Bluetooth BR/EDR connection request and start streaming command 154A from the multimedia playback device 102, and in response, transmits the Bluetooth BR/EDR Advanced Audio Distribution Profile (A2DP) first multimedia content 156A to the multimedia playback device 102. The multimedia playback device 102 plays back the first multimedia content "A", for example as a jukebox, in accordance with at least one embodiment of the present invention.

FIG. 1F is an illustration of the example embodiment of the network of FIG. 1E, wherein the multimedia playback device 102 completes playing back the first multimedia content "A". In response, the multimedia playback device 102 selects 140B the second mobile wireless device 100B from its play list 120 and determines that the source of the second multimedia content is an internet server 106 at an internet address. In response, the multimedia playback device 102 transmits a start streaming command 154B to the internet server 106 at the internet address, in accordance with at least one embodiment of the present invention. Device 102 may also check with device 100B if it has any updated information about a played Internet stream, before it starts to play.

FIG. 1G is an illustration of the example embodiment of the network of FIG. 1F, wherein the multimedia playback device 102 receives the second multimedia content "B" 107 from the internet server 106. The multimedia playback device 102 plays back the second multimedia content "B", for example as a jukebox, in accordance with at least one embodiment of the present invention.

FIG. 2A is an illustration of an example embodiment of a network setup for three mobile wireless devices 100A, 100B, and 100C, and a wireless media playback device 102 operating as a jukebox, similar to that shown in FIG. 1A, in accordance with at least one embodiment of the present invention. The media may include multimedia content. Here the wireless multimedia playback device 102 has Jukebox capability and it is advertising this capability, for example, as a certain UUID in Bluetooth Low Energy advertisement packets. The mobile wireless devices 100A, 100B, and 100C, (mobile phones in this case) may read this advertisement and with the jukebox application, they are able to connect with wireless multimedia playback device 102, pair with a Bluetooth LE module in the wireless multimedia playback device 102, and connect to it.

Figure 2B:
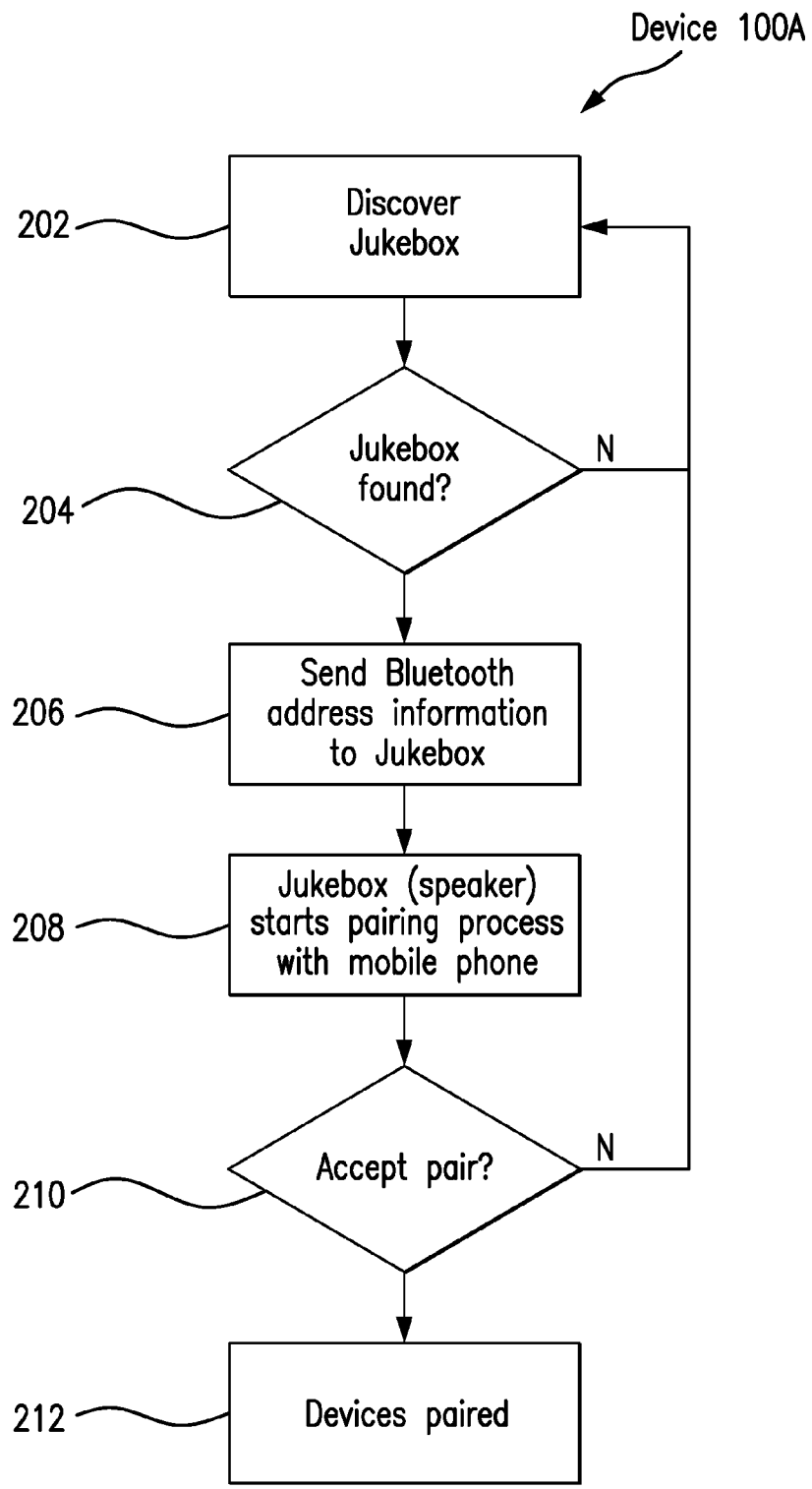
FIG. 2B is an illustration of an example flow diagram of a process for Bluetooth LE device pairing of the first mobile wireless device and the wireless multimedia playback device following the device discovery stage of FIG. 1A, in accordance with at least one embodiment of the present invention.

FIG. 2B is an illustration of an example flow diagram of an initial process for Bluetooth LE device pairing of the first mobile wireless device 100A and the wireless multimedia playback device 102 following the device discovery stage of FIG. 1A, in accordance with at least one embodiment of the present invention. The mobile wireless device 100A discovers (step 202) multimedia playback device using Bluetooth LE scanning. The mobile wireless device 100A searches for a certain UUID indicating a jukebox function and the type of the jukebox (i.e., Internet cloud and/or local streaming is in use). When the desired UUID has been found (step 204), mobile wireless device 100A sends (step 206) its Bluetooth address over a Bluetooth LE link to the multimedia playback device 102 jukebox, in case of local streaming, and its multimedia content ID and/or service ID and/or user ID, in case of Internet or cloud streaming. With this information, the multimedia playback device 102 jukebox may initiate the pairing process (steps 208, 210, 212) using Bluetooth LE or it may connect to the Internet cloud service. The mobile wireless device may display to its user, the pairing dialog that may be accepted or denied by the user. Alternately, the pairing process may be initiated when the mobile wireless device 100A has added itself to the play list of the multimedia playback device 102 jukebox.

Figure 3:
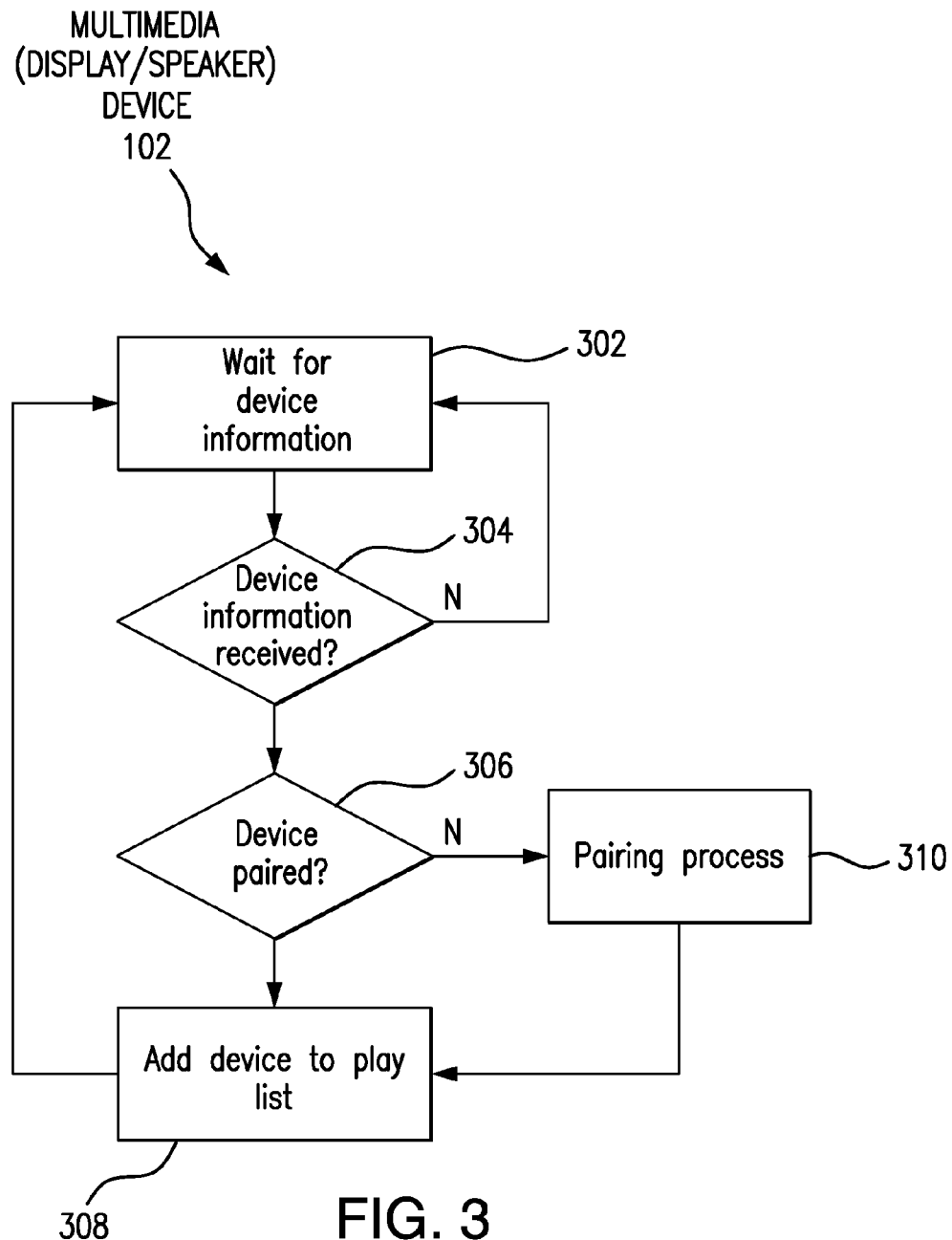
FIG. 3 is an illustration of an example flow diagram of a process for the multimedia playback device to update its play list with the address of the first mobile wireless device and the indication of the source of multimedia content is, for example, the first mobile wireless device, itself, in accordance with at least one embodiment of the present invention.

FIG. 3 is an illustration of an example flow diagram of a process for the multimedia playback device 102 to update its play list 120 with the address of the first mobile wireless device 100A and the indication of the source of multimedia content is, for example, the first mobile wireless device 100A, itself, in accordance with at least one embodiment of the present invention. Mobile wireless device 100A may add itself to the Jukebox play list 120 over a Bluetooth LE connection. The mobile wireless device 100A indicates its Bluetooth address over the Bluetooth LE connection and that address is added in devices list of Jukebox play list 120. The multimedia playback device 102 jukebox waits (step 302) for the device address information. When the address is received (step 304) over Bluetooth LE, multimedia playback device 102 jukebox may power up its Bluetooth module and check (step 306) if that received address is in the paired address list. If not, a pairing process is initiated (step 310), as indicated in FIG. 2B. After that process, the paired device address is added (step 308) into play list 120. If mobile wireless device 100A is already a paired device, its Bluetooth address is directly added into the play list 120. When first mobile wireless device 100A is added to the play list 120, the multimedia playback device 102 jukebox connects to the first mobile wireless device and sends to it a start streaming command. If more mobile wireless devices are added into device list 120, multimedia playback device 102 jukebox connects to the next device after the first multimedia content of the first device has ended (and so on).

Figure 4:
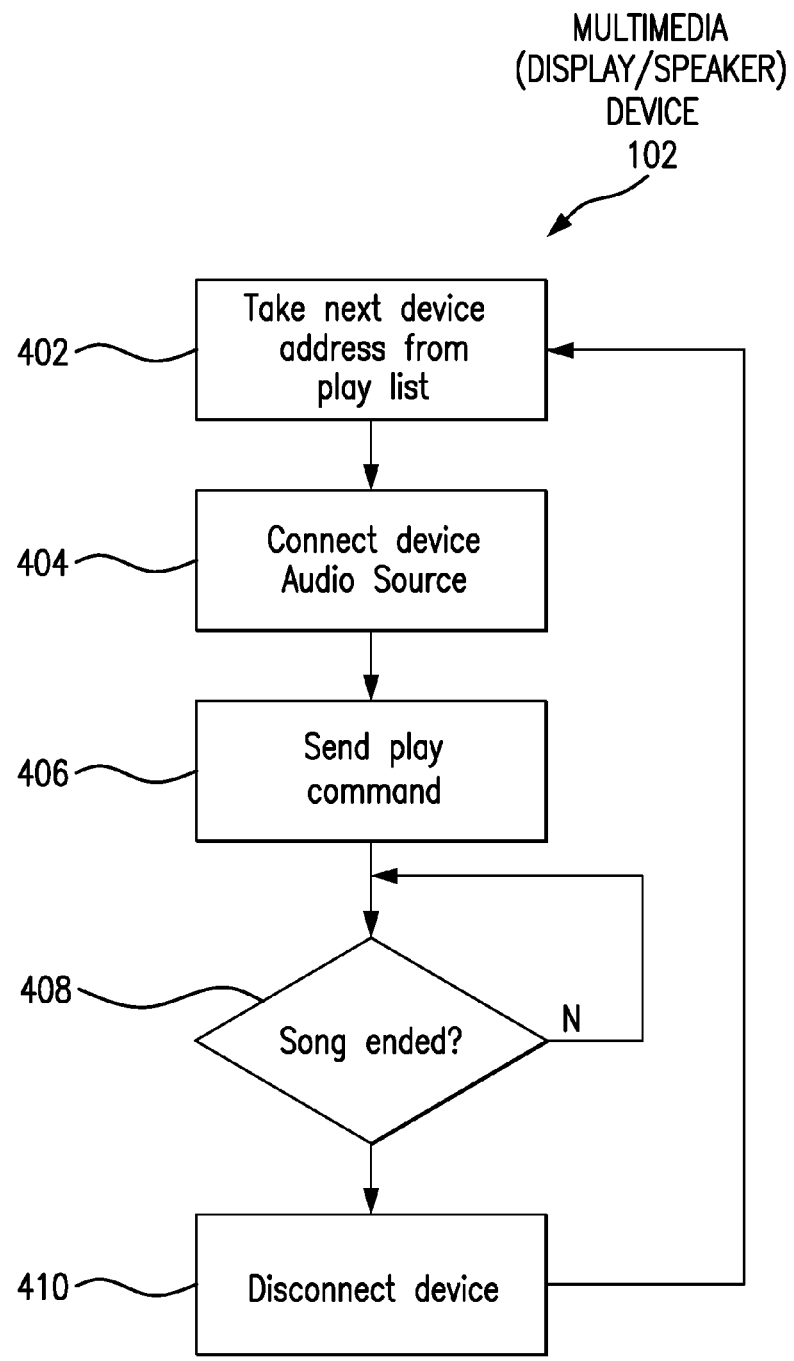
FIG. 4 is an illustration of an example flow diagram of a process for the multimedia playback device selecting the first mobile wireless device from its play list and determining that the source of the first multimedia content is the first mobile wireless device, itself. In response, the multimedia playback device transmits a start streaming command to the first wireless device. After completing the playing back of the first multimedia content, the multimedia playback device disconnects the first mobile wireless device, in accordance with at least one embodiment of the present invention.

FIG. 4 is an illustration of an example flow diagram of a process for the multimedia playback device 102 selecting the first mobile wireless device 100A from its play list 120 and determining that the source of the first multimedia content is the first mobile wireless device 100A, itself. In response, the multimedia playback device 102 transmits a start streaming command to the first wireless device 100A. After completing the playing back of the first multimedia content, the multimedia playback device 102 disconnects the first mobile wireless device 100A, in accordance with at least one embodiment of the present invention. When one or more devices are added into multimedia playback device 102 jukebox play list 120, multimedia playback device 102 takes the first (or the next available address) (step 402) from the play list 120 and connects (step 404) to that device's Audio source (e.g. over Bluetooth). After that, the multimedia playback device 102 jukebox sends (step 406) a start streaming command and begins to play the multimedia content, for example, a song. When song ends (step 408), the multimedia playback device 102 jukebox disconnects (step 410) mobile wireless device 100A (maybe sending a "next song and stop command" before disconnection). After that, the multimedia playback device 102 jukebox selects the next device from the play list 120 or cycles back to the first occurring one in the list, if the last occurring device from list was disconnected. The multimedia content may be a local song stored in the mobile wireless device 100A or it may be a song accessed from a server and streamed over Bluetooth to the multimedia playback device 102 jukebox.

Figure 5:
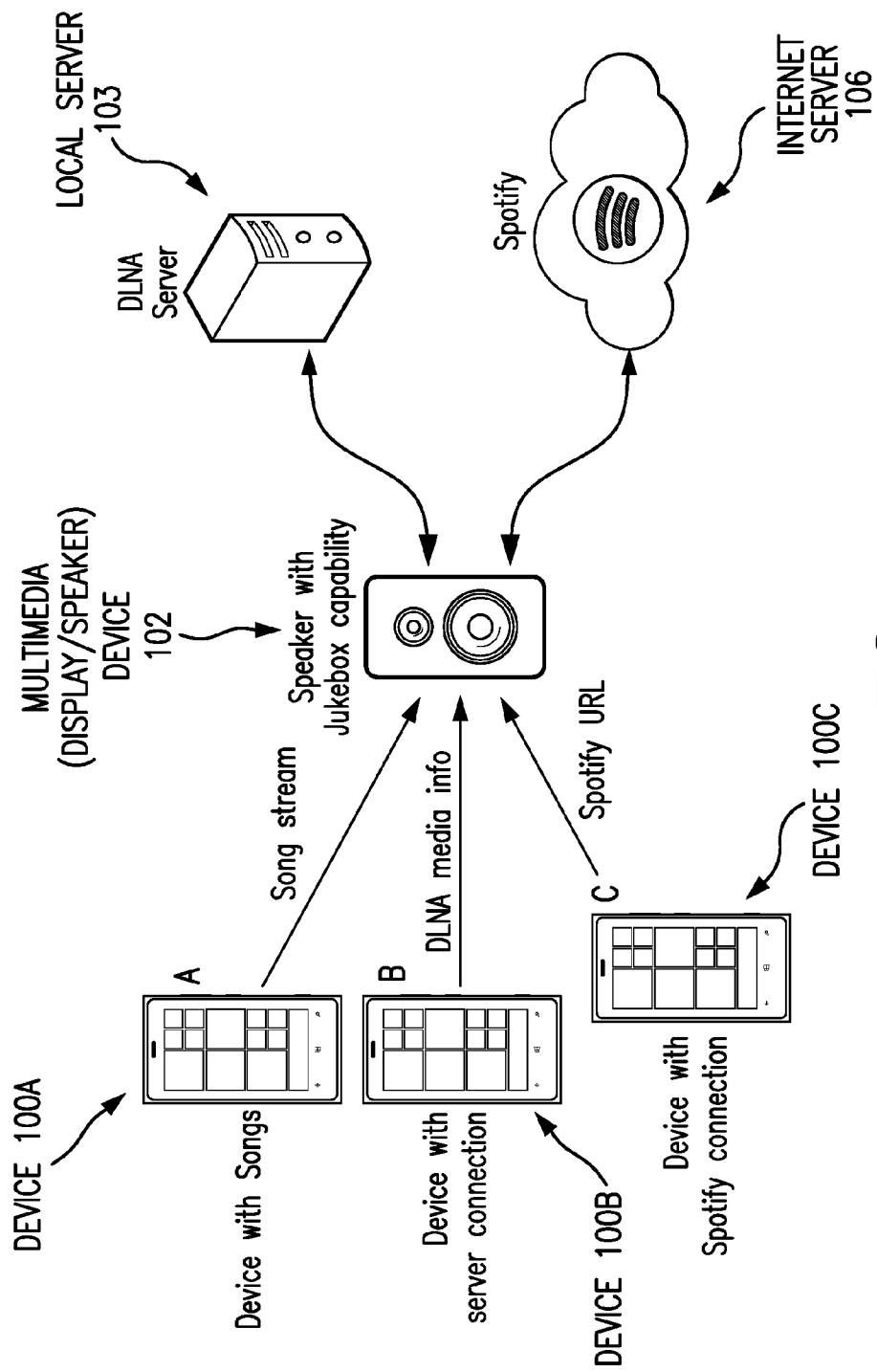
FIG. 5 is an illustration of an example embodiment of a network setup for three mobile wireless devices and a wireless multimedia playback device operating as a jukebox that may be connected to a local server or an Internet server, in accordance with at least one embodiment of the present invention.

FIG. 5 is an illustration of an example embodiment of a network setup for three mobile wireless devices 100A, 100B, and 100C, and a wireless multimedia playback device 102 operating as a jukebox that may be connected to a local server 103 or an Internet server 106, in accordance with at least one embodiment of the present invention. The multimedia content to be played in multimedia playback device 102. It is also possible that the content comes from the local server 103 or an Internet server 106. Each wireless mobile device may have different source that is played by the multimedia playback device 102. Some of multimedia content may be transmitted from the wireless mobile device using Bluetooth streaming. Other multimedia content may be transmitted from the local server 103 (such as media from Digital Living Network Alliance (DLNA)) and the Internet server 106. When a wireless mobile device is added into play list 120, the source information may indicate, for example; Bluetooth A2DP, DLNA server, Spotify URL, or other sources. This, of course, requires a more capable multimedia playback device 102 Jukebox device, having such communication capabilities.

Regarding the case in FIG. 5, the multimedia playback device 102 may first connect to device 100A. The multimedia playback device 102 knows from process of updating the play list 120, that the mobile wireless device 100A will be streaming audio over Bluetooth. Hence the multimedia playback device 102 connects to mobile wireless device 100A over Bluetooth audio (A2DP) and orders the mobile wireless device 100A to start streaming (playing). Next the mobile wireless device 100B may be using the local DLNA media server 103. The multimedia playback device 102 has the connection to the local DLNA server 103 and it obtains the song/media path information from the mobile wireless device 100B and starts media streaming from the local DLNA server. The third mobile wireless device 100C is using an Internet-based Spotify™ stream. The multimedia playback device 102 obtains the Spotify URL from the mobile wireless device 100C and possible user-id and password for a certain user account (or it may use its own user account, if available), and starts streaming from the Internet-based Spotify server.

Figure 6:
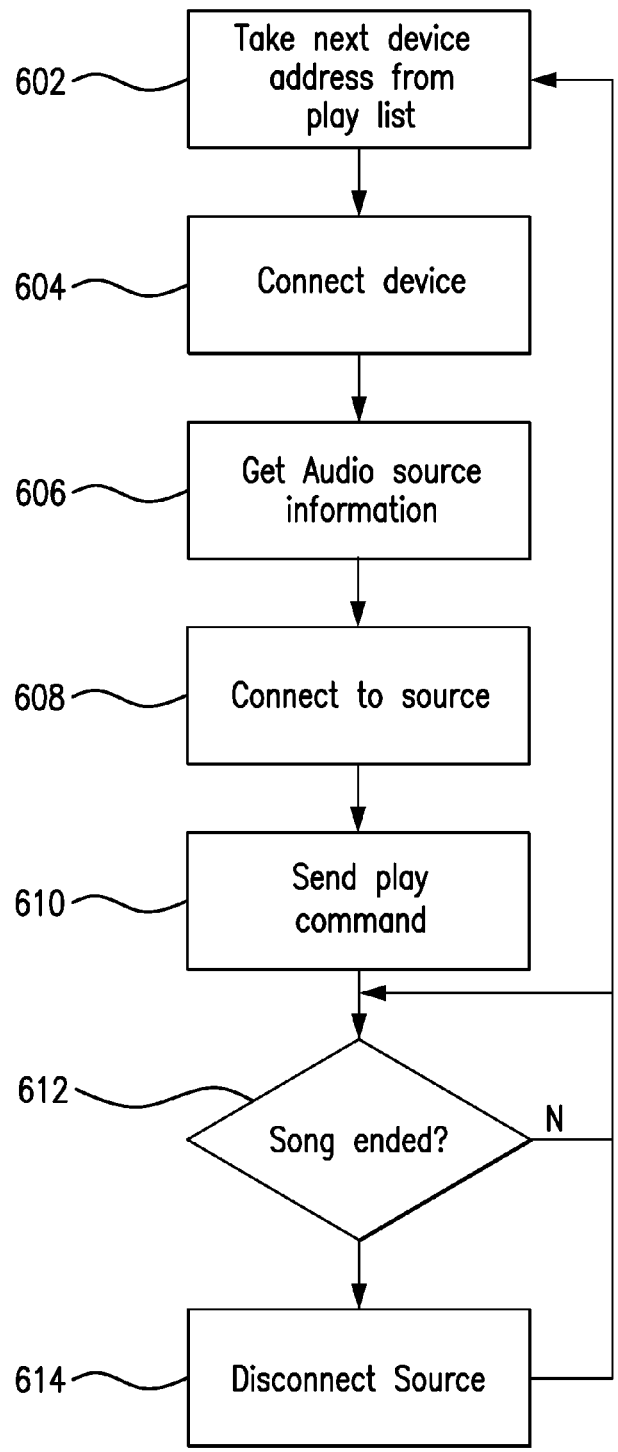
FIG. 6 is an illustration of an example flow diagram of a process for the multimedia playback device selecting the second mobile wireless device from its play list and determining that the source of the first multimedia content is the Internet server at an Internet address. In response, the multimedia playback device transmits a start streaming command to the Internet server. After completing the playing back of the second multimedia content, the multimedia playback device disconnects the Internet server, in accordance with at least one embodiment of the present invention.

FIG. 6 is an illustration of an example flow diagram of a process for the multimedia playback device 102 selecting the third mobile wireless device 100C from its play list 120 and determining that the source of the first multimedia content is the Internet server 106 at an Internet address. In response, the multimedia playback device 120 transmits a start streaming command to the Internet server 106 (or locally in application which is playing the stream). After completing the playing back of the second multimedia content, the multimedia playback device 102 disconnects the stream coming from the Internet server 106, in accordance with at least one embodiment of the present invention. Here the next device is taken (step 602) from the list and connected (step 604). Based on information given to Jukebox when device was added, Jukebox knows (step 606) which kind of source is providing media information (this source/media information may be obtained from the mobile device each time that it is its turn). The multimedia playback device 102 connects to the source (step 608) and transmits a start streaming command (step 610) to the source. After completing the playing back (step 612), the multimedia playback device 102 disconnects (step 614) the first mobile wireless device 100A. The media information that is obtained from the wireless mobile device, enables the multimedia playback device 102 to connect to the source even beforehand, using specific media-based information obtained from mobile device. The connection between multimedia playback device 102 and mobile device does not need to be streaming capable, and thus it may be Bluetooth LE or WLAN (in the case where a separate music server/internet server is used). With the capability of the multimedia playback device 102 connecting to a server, the mobile wireless device does not have to stream the content itself, but instead the content may be streamed directly to the multimedia playback device 102.

FIG. 7 is an illustration of an example play list 120 in the multimedia playback device 102, in accordance with at least one embodiment of the present invention. The multimedia playback device 102 identifies the mobile wireless device with its BT/BLE address (702), media type (704) and media address (706) obtained during play list creation, as well as possible user id & password (708) which is delivered to multimedia playback device 102 with dedicated Jukebox client software. Client software may be needed in the cases where multimedia playback device 102 obtains a stream from a server or URL. The multimedia playback device 102 uses the media address to access media content and the media type to determine how this media is to be played. With mobile wireless device 100A, the stream is coming from the device, itself, so media address is not needed and A2DP tells what kind of media it is. With device 100B, the media type ID is DLNA audio, so the server and media address is used to directly access the media. In the third wireless device 100C, the Internet-based Spotify URL is used to access media content and the user id & password is used to authenticate access. The ID and password used may be protected so that multimedia playback device 102 does not see them in clear text.

FIG. 8A is an illustration of an example flow diagram 800 of an example process in the mobile wireless device 100A, in accordance with at least one embodiment of the present invention. The steps of the flow diagram represent computer code instructions stored in the RAM and/or ROM memory, which when executed by the central processing units (CPU) 125, carry out the functions of the example embodiments of the invention. The steps may be carried out in another order than shown and individual steps may be combined or separated into component steps. The flow diagram has the following steps:

Step 802: receiving, by an apparatus, one or more wireless discovery messages over a first wireless communication protocol;

Step 804: determining, by the apparatus, whether a source device of the one or more wireless discovery messages is a media playback device having required characteristics, based on information obtained from the one or more received wireless discovery messages;

Step 806: transmitting, by the apparatus, a device information message that includes at least information usable for the source device to access the apparatus using a second wireless communication protocol, in response to determining that the source device is a media playback device having the required characteristics;

Step 808: establishing, by the apparatus, a wireless communication connection with the source device over the second wireless communication protocol in response to receiving a connection request from the source device via the second wireless communication protocol; and Step 810: providing, by the apparatus, information regarding media content for playback to the source device over the wireless communication connection via the second wireless communication protocol.

FIG. 8B is an illustration of an example flow diagram 850 of an example process in the multimedia device 102, in accordance with at least one embodiment of the present invention. The steps of the flow diagram represent computer code instructions stored in the RAM and/or ROM memory of the multimedia device 102, which when executed by the central processing units (CPU) 125, carry out the functions of the example embodiments of the invention. The steps may be carried out in another order than shown and individual steps may be combined or separated into component steps. The flow diagram has the following steps:

Step 852: transmitting, by an apparatus, one or more wireless discovery messages over a first wireless communication protocol;

Step 854: receiving, by the apparatus, a first device information message that includes at least information usable to access a first mobile wireless device using a second wireless communication protocol, and an indication of a first source of first media content that the first mobile wireless device requests the apparatus to playback;

Step 856: receiving, by the apparatus, a second device information message that includes at least information usable to access a second mobile wireless device using the second wireless communication protocol, and an indication of a second source of second media content that the second mobile wireless device requests the apparatus to playback;

Step 858: selecting, by the apparatus, the first mobile wireless device, transmitting a connection request to the first mobile wireless device over the second wireless communication protocol, and establishing a wireless communication connection with the first wireless device over the second wireless communication protocol;

Step 860: receiving, by the apparatus, information regarding the first media content for playback over the wireless communication connection over the second wireless communication protocol;

Step 862: selecting, by the apparatus, the second mobile wireless device, transmitting a connection request to the second mobile wireless device over the second wireless communication protocol, and establishing a wireless communication connection with the second wireless device over the second wireless communication protocol; and Step 864: receiving, by the apparatus, information regarding the second media content for playback over the wireless communication connection via the second wireless communication protocol.

FIG. 9 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hardwired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   transmitting, by an apparatus, one or more wireless discovery messages over a first wireless communication protocol;
   receiving, by the apparatus, a first device information message that includes at least information usable to access a first mobile wireless device using a second wireless communication protocol, and an indication of a first source of first media content that the first mobile wireless device requests the apparatus to playback;
   receiving, by the apparatus, a second device information message that includes at least information usable to access a second mobile wireless device using the second wireless communication protocol, and an indication of a second source of second media content that the second mobile wireless device requests the apparatus to playback;
   selecting, by the apparatus, the first mobile wireless device and transmitting a connection request to the first mobile wireless device over the second wireless communication protocol, and establishing a wireless communication connection with the first wireless device over the second wireless communication protocol;
   receiving, by the apparatus, information regarding the first media content for playback over the wireless communication connection via the second wireless communication protocol;
   selecting, by the apparatus, the second mobile wireless device and transmitting a connection request to the second mobile wireless device over the second wireless communication protocol, and establishing a wireless communication connection with the second wireless device over the second wireless communication protocol; and
   receiving, by the apparatus, information regarding the second media content for playback over the wireless communication connection via the second wireless communication protocol;
   wherein the first wireless communication protocol is the Bluetooth Low Energy protocol and the second wireless communication protocol is one of Bluetooth basic rate/enhanced data rate (BR/EDR) protocol or IEEE 802.11 wireless local area network protocol.

2. The method of claim 1, further comprising:
   waiting, by the apparatus, to select the second wireless device, while playing back the first media content.

3. The method of claim 1, further comprising:
   wherein the device information message indicates that the first source of the first media content is the first mobile wireless device;
   transmitting, by the apparatus, a start streaming command to the first wireless device; and
   receiving, by the apparatus, the media content from the first wireless device over the second wireless communications protocol, in response to the start streaming command.

4. The method of claim 1, further comprising:
   wherein the device information message indicates that the first source of the first media content is a server at an address;
   transmitting, by the apparatus, a start streaming command to the server at the address; and
   receiving, by the apparatus, the media content from the server, in response to the start streaming command.

5. The method of claim 1, further comprising:
   maintaining, by the apparatus, a play list from which the apparatus selects the first media content followed by the second media content.

6. The method of claim 1, wherein the device information message indicates that the first source of the first media content is an internet server at an internet address;
   transmitting, by the apparatus, a start streaming command to the internet server at the internet address; and
   receiving, by the apparatus, the media content from the internet server, in response to the start streaming command.

7. The method of claim 1, wherein the device information message indicates that the first source of the first media content is an internet server at an internet address;
   receiving, by the apparatus, necessary authentication or authorization information for allowing the apparatus to fetch the first media content from the internet server.

8. An apparatus, comprising:
   at least one processor;
   at least one memory including computer program code;
   the at least one memory and the computer program code configured to, with the at least one processor, cause the apparatus at least to:
   transmit one or more wireless discovery messages over a first wireless communication protocol;
   receive a first device information message that includes at least information usable to access a first mobile wireless device using a second wireless communication protocol, and an indication of a first source of first media content that the first mobile wireless device requests the apparatus to playback;
   receive a second device information message that includes at least information usable to access a second mobile wireless device using the second wireless communication protocol, and an indication of a second source of second media content that the second mobile wireless device requests the apparatus to playback;
   select the first mobile wireless device and transmit a connection request to the first mobile wireless device over the second wireless communication protocol, and establish a wireless communication connection with the first wireless device over the second wireless communication protocol;
   receive information regarding the first media content for playback over the wireless communication connection via the second wireless communication protocol;
   select the second mobile wireless device and transmit a connection request to the second mobile wireless device over the second wireless communication protocol, and establish a wireless communication connection with the second wireless device over the second wireless communication protocol; and
   receive information regarding the second media content for playback over the wireless communication connection via the second wireless communication protocol;
   wherein the first wireless communication protocol is the Bluetooth Low Energy protocol and the second wireless communication protocol is one of Bluetooth basic rate/enhanced data rate (BR/EDR) protocol or IEEE 802.11 wireless local area network protocol.

9. The apparatus of claim 8, further comprising:
   the at least one memory and the computer program code configured to, with the at least one processor, cause the apparatus at least to:
   wait to select the second wireless device, while playing back the first media content.

10. The apparatus of claim 8, further comprising:
wherein the device information message indicates that the first source of the first media content is the first mobile wireless device;
the at least one memory and the computer program code configured to, with the at least one processor, cause the apparatus at least to:
transmit a start streaming command to the first wireless device; and
receive the media content from the first wireless device over the second wireless communications protocol, in response to the start streaming command.

11. The apparatus of claim 8, further comprising:
wherein the device information message indicates that the first source of the first media content is a server at an address;
the at least one memory and the computer program code configured to, with the at least one processor, cause the apparatus at least to:
transmit a start streaming command to the server at the address; and
receive the media content from the server, in response to the start streaming command.

12. A computer program product comprising computer executable program code recorded on a computer readable, non-transitory storage medium, the computer executable program code comprising:
 code for transmitting, by an apparatus, one or more wireless discovery messages over a first wireless communication protocol;
 code for receiving, by the apparatus, a first device information message that includes at least information usable to access a first mobile wireless device using a second wireless communication protocol, and an indication of a first source of first media content that the first mobile wireless device requests the apparatus to playback;
 code for receiving, by the apparatus, a second device information message that includes at least information usable to access a second mobile wireless device using the second wireless communication protocol, and an indication of a second source of second media content that the second mobile wireless device requests the apparatus to playback;
 code for selecting, by the apparatus, the first mobile wireless device and transmitting a connection request to the first mobile wireless device over the second wireless communication protocol, and establishing a wireless communication connection with the first wireless device over the second wireless communication protocol;
 code for receiving, by the apparatus, information regarding the first media content for playback over the wireless communication connection via the second wireless communication protocol;
 code for selecting, by the apparatus, the second mobile wireless device and transmitting a connection request to the second mobile wireless device over the second wireless communication protocol, and establishing a wireless communication connection with the second wireless device over the second wireless communication protocol; and
 code for receiving, by the apparatus, information regarding the second media content for playback over the wireless communication connection via the second wireless communication protocol;
wherein the first wireless communication protocol is the Bluetooth Low Energy protocol and the second wireless communication protocol is one of Bluetooth basic rate/enhanced data rate (BR/EDR) protocol or IEEE 802.11 wireless local area network protocol.

* * * * *